United States Patent
Udagawa et al.

(10) Patent No.: US 6,525,105 B1
(45) Date of Patent: Feb. 25, 2003

(54) METHODS OF SEPARATING VULCANIZED OR UNVULCANIZED RUBBER AND SEPARATING RUBBER COMPOSITE, RUBBER COMPOSITION CONTAINING RECOVERED RUBBER OR RECOVERED CARBON BLACK, AND PROCESS FOR PRODUCING CARBON BLACK

(75) Inventors: Yoshitaka Udagawa, Kanagawa (JP); Susumu Ashizawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/720,247

(22) PCT Filed: May 15, 2000

(86) PCT No.: PCT/JP00/03109

§ 371 (c)(1),
(2), (4) Date: Jan. 5, 2001

(87) PCT Pub. No.: WO00/69953

PCT Pub. Date: Nov. 23, 2000

(30) Foreign Application Priority Data

| May 13, 1999 | (JP) | ............................................. | 11-132744 |
| Feb. 14, 2000 | (JP) | ....................................... | 2000-035831 |
| Feb. 14, 2000 | (JP) | ....................................... | 2000-035895 |
| Feb. 14, 2000 | (JP) | ....................................... | 2000-035896 |
| Feb. 14, 2000 | (JP) | ....................................... | 2000-035897 |
| May 12, 2000 | (JP) | ....................................... | 2000-140679 |

(51) Int. Cl.$^7$ ............................................... C08J 11/04
(52) U.S. Cl. ...................................... 521/41; 423/449.2
(58) Field of Search ........................... 521/41; 423/449.2

(56) References Cited

U.S. PATENT DOCUMENTS

| 4,161,464 A | * | 7/1979 | Nicholas | ..................... 260/2.3 |
| 4,284,616 A | * | 8/1981 | Solbakken | ................... 423/461 |
| 4,305,850 A | | 12/1981 | Watabe et al. | |
| 5,037,628 A | * | 8/1991 | Fader | .......................... 423/449 |
| 5,452,670 A | * | 9/1995 | Towne | .......................... 110/346 |
| 5,602,186 A | * | 2/1997 | Myers | .......................... 521/41 |
| 5,621,037 A | * | 4/1997 | Hong | .......................... 524/464 |
| 5,622,998 A | * | 4/1997 | Tanaka | .......................... 521/41 |
| 5,677,354 A | * | 10/1997 | Lima | ............................ 521/41 |
| 5,798,394 A | * | 8/1998 | Myers | ........................ 521/42.5 |
| 5,824,731 A | * | 10/1998 | Rondy | .......................... 524/496 |
| 5,852,062 A | * | 12/1998 | Carpenter | ..................... 521/41 |
| 6,337,302 B1 | * | 1/2002 | Teng | .......................... 502/432 |

OTHER PUBLICATIONS

Journal of Japan Rubber Association 49 (1976), pp. 829–836 and its English abstract.

* cited by examiner

Primary Examiner—Edward J. Cain
(74) Attorney, Agent, or Firm—Rader, Fishman & Grauer PLLC

(57) ABSTRACT

A method of separating a vulcanized or unvulcanized rubber into a rubber ingredient and a filler ingredient such as carbon black which comprises liquefying the vulcanized or unvulcanized rubber at ordinary temperature and ordinary pressure; and a method of separating from a rubber composite a component other than those. The methods comprise immersing, optionally with stirring, a rubber composite or a vulcanized rubber composition each in the form of a block in an organic solvent containing 0.01 to 50% peroxide such as benzoyl peroxide to liquefy the vulcanized rubber composition in the solvent and separating the filler ingredient and other components by centrifugal separation, membrane separation, or decantation.

34 Claims, 7 Drawing Sheets

(A)

25mg/5ml (B)

125mg/5ml (C)

250mg/5ml (D)

375mg/5ml (A)

0.5%    1.0%

(B)

0.5%    1.0%

METHODS OF SEPARATING VULCANIZED OR UNVULCANIZED RUBBER AND SEPARATING RUBBER COMPOSITE, RUBBER COMPOSITION CONTAINING RECOVERED RUBBER OR RECOVERED CARBON BLACK, AND PROCESS FOR PRODUCING CARBON BLACK

TECHNICAL FIELD

This invention relates to a method for separating rubber components and filler components from a vulcanized rubber or an unvulcanized rubber by liquidifying the vulcanized rubber or the unvulcanized rubber at normal temperature and normal pressure; and a method for separating structural members from a rubber composite material.

This invention also relates to a reusable rubber and a reusable carbon black recovered by such separation method; and a rubber composition containing such rubber or such carbon black. More specifically, this invention relates to a recovered rubber having excellent physical properties which has been obtained by treating a waste rubber composition by a particular method; a rubber composition having such recovered rubber blended therein; a recovered carbon black having excellent physical properties which has been obtained by treating a waste rubber composition by a particular method, and a rubber composition having such recovered carbon black blended therein.

Furthermore, this invention relates to a method for producing a carbon black which, when blended in a vulcanized rubber; exhibits extremely low value of loss tangent (tan δ) at 60° C. which is an index for low fuel cost of the tire; such carbon black; and a rubber composition and a vulcanized rubber containing such carbon black.

BACKGROUND ART

Disposal of industrial wastes has nowadays become a serious social problem, and in the case of tires, the amount discarded is enormous and not only use as a fuel by incineration but also recovery and reuse of the raw materials included in the tire, namely, the rubber and the rubber subsidiary materials has become an urgent agenda. A rubber, however, is quite stable once it has vulcanized due to its crosslinked structure, and the rubber has been insoluble at room temperature in ordinary solvents, and at most, swellable to some extent in such solvents.

One process known in the art for the recovery of the rubber, carbon black, and other rubber subsidiaries from vulcanized rubber wastes is recovery of the rubber as a gaseous or liquid hydrocarbon by thermal decomposition of the vulcanized rubber. For example, JP-A 60-40193 discloses recovery of the rubber as a liquid hydrocarbon by thermal decomposition of used tires, cable wastes, or other vulcanized rubber wastes together with wastes of polyethylene, polypropylene or the like at a temperature of 150 to 500° C. and a pressure of 20 to 800 bar, and in the presence of a solvent. JP-A 7-310076 discloses a method for obtaining a decomposed oil having a reduced sulfur content wherein a vulcanized rubber is thermally decomposed to obtain a hydrocarbon (a gaseous product) and a decomposed oil containing carbon black (slurry-like product) and wherein the thermal decomposition is conducted in the presence of a hydrogen-donating solvent such as tetralin.

Also proposed are a method wherein direct or indirect heating is conducted at a high temperature of, for example, at least 500° C.; a method wherein the thermal decomposition is conducted in the presence of a solvent, a catalyst and hydrogen (U.S. Pat. No. 3,704,108); a method wherein the thermal decomposition is conducted in the presence of a molten salt (European Patent No. 71789, U.S. Pat. No. 3,996,022), and the like.

Such recovery of the rubber materials and subsidiaries from vulcanized rubber products by the thermal decomposition requires an enormous cost for installation when such recovery is to be conducted in an industrial scale, since a high temperature, high pressure thermal decomposition apparatus is required for the thermal decomposition.

A method for plasticizing vulcanized rubber powder is disclosed in Journal of Japan Rubber Association 49 (1976) page 829. In this method, various types of sulfur-vulcanized rubbers in the form of a powder having a particle diameter of up to 2 mm are immersed in carbon tetrachloride or toluene in the presence of benzoyl peroxide at a rubber powder (mg)/toluene (ml) ratio of 500/7 to 500/2 to thereby promote decomposition in the liquid by air oxidation at a temperature of 70 to 100° C.

This method, however, was an attempt to regenerate the vulcanized rubber by plasticizing the vulcanized rubber under heating, and re-vulcanizing and adding the plasticized reaction product in the fresh rubber. The article of Journal of Japan Rubber Association also described that the vulcanized rubber containing no carbon black was more susceptible to oxidative decomposition than the vulcanized rubber containing carbon black. In view of the situation that carbon black is blended in most commercially available industrial rubbers, this method is not very useful. In addition, the vulcanized rubber regenerated from the reaction product of the oxidative decomposition reaction exhibited inferior physical properties when the ratio of the re-vulcanized rubber to the fresh rubber was high.

When the rubber materials and subsidiaries are recovered from the vulcanized rubber product by the thermal decomposition as described above, substantially all of the rubber components in the vulcanized rubber are converted into low molecular weight hydrocarbons ($C_4$-benzene, $C_4$-cyclohexane, etc.). Main use of the thus recovered hydrocarbon has been used as a light fuel at the furthest, and such hydrocarbon could not be reused as a starting material of the rubber composition since the starting rubber is required a certain high molecular weight.

The disposal of industrial wastes is not a problem restricted to vulcanized rubber products, and scraps produced in kneading and processing as well as other unvulcanized scrap rubbers inevitably generated in the production of the vulcanized rubber products have also become a serious problem. In view of such situation, recovery of rubber materials and subsidiaries, and efficient reuse of such materials are also an important issue.

In the typical production of a rubber product such as tire, the starting rubber is first masticated, and the thus softened rubber is then admixed with a filler, a softener, a vulcanizer, a vulcanization accelerator, an antiaging agent and the like. The mixture is then kneaded, molded in an extruder of the like, vulcanized, and formed into products by appropriate processing. As is well known, a large amount of unvulcanized scrap rubber is inevitably produced in the course of such steps. Exemplary such unvulcanized scrap rubbers include rubber scraps discarded in the steps of mastication and kneading due to early vulcanization or uneven vulcanization (burned spot or scorching), and defective rubbers discarded in the step of vulcanization due to the so called sagging, and there are various types of the scrap rubbers depending on their production process including the one wherein vulcanized and unvulcanized parts are intermingled, and the one wherein steel member or organic fiber member is attached.

The issue of industrial waste disposal has recently become a quite serious social problem, and with regard to the unvulcanized scrap rubbers discharged from factories, it has been conceived that, not only the incineration of the unvulcanized scrap rubbers as fuels, but also the recovery of the starting rubber and rubber subsidiary materials and their efficient reuse are important.

Therefore, in the disposal of such unvulcanized scrap rubbers, complicated preliminary steps of sorting the scrap rubbers by their types, and removing members comprising steel or organic fibers as well as vulcanized portions have been conducted, and the recovery of the rubber for reuse in other rubber products has been only limited and most scrap rubbers have been discarded.

In view of such situation, if a method capable of separating structural members by liquidifying the vulcanized rubber composition at room temperature or at a relatively low temperature under normal pressure, or a method wherein a vulcanized rubber composition can be separated into the rubber component and the filler component at room temperature or at a relatively low temperature under normal pressure were realized, installation such as thermal decomposition apparatus or heating apparatus will no longer be necessary and simple, convenient recovery of the rubber materials and subsidiaries from the vulcanized rubber products at low cost will be enabled, and such recovery has great industrial applicability. More specifically, if a rubber component which can withstand the reuse can be separated and recovered from the rubber waste in general, and the rubber composition having the recovered rubber blended therein exhibits particular set of properties necessary for the highly demanded rubber composition, such method has high industrial applicability.

The situation is the same for unvulcanized rubbers. If structural members could be separated from unvulcanized scrap rubbers or the unvulcanized scrap rubber could be separated into the rubber component and the filler component with no complicated preliminary steps of sorting the scrap rubbers by their types or removing the members comprising steel or organic fibers as well as vulcanized portions, and with no thermal decomposition, heating, or other installation, a simple, convenient recovery of the rubber materials, and subsidiaries from the unvulcanized scrap rubbers at low cost will be available, and such recovery has great industrial applicability.

With regard to the recovered carbon black, the carbon black which has been recovered by thermal decomposition at a high temperature of 500° C. or higher as described above is mostly inferior in its quality compared to the carbon black which has been used as a starting material. Accordingly, reuse of carbon black has been deemed difficult, and no carbon black which can be used in practice has so far been obtained.

On the other hand, the substance that has been recovered by thermal decomposition at a relatively low temperature of about 400° C. in the presence of a solvent or a catalyst was a substance comprising a mixture of oil, rubber and carbon black, and separation of such components was difficult.

As described above, the situation is the same for carbon black. If a reusable carbon black of high purity which has a quality equivalent or better than the carbon black that has been used for the staring material could be recovered from any rubber waste with no thermal decomposition, heating, or other installation and at room temperature or at a relatively low temperature under normal pressure, and the rubber composition produced by incorporating such recovered carbon black had particular set of physical properties which is required for the highly demanded rubber composition, such carbon black has great industrial applicability.

For example, there is recently a growing need for a rubber composition having high damping property, namely, high hysteresis, which is capable of converting the vibration into heat to thereby reduce seismic energy. The rubber composition having such properties can be used, for example, in a seismic energy absorbing member which is rapidly becoming common, namely, in seismic isolation which is used for seismic resistance, vibration control, bridge bearing, or basic isolation of buildings in order to protect bridges and buildings from earth quakes by reducing the seismic acceleration.

Improvement in rolling resistance of automobile tires has also been long awaited as a means for reducing energy loss during the drive to thereby improve fuel economy. The rolling resistance of a tire can be evaluated by using loss tangent at 50° C. to 70° C. (typically tan $\delta$ at 60° C.) for the index, and a rubber composition which can be produced into a vulcanized rubber exhibiting a low tan $\delta$ value at 60° C.

A tire has a large amount of carbon black incorporated therein for the purpose of reinforcement, and influence of the carbon black on abrasion resistance, mechanical strength, rubber properties and other properties of the tire is considerable. However, it is not easy to blend the carbon black for the purpose of reinforcement and maintain the rubber properties, and simultaneously, improve the fuel economy.

Solutions for such problem by improving surface activity of the carbon black have been proposed. In an exemplary such method, focus is on hydrogen content and oxygen content of the carbon black, and their ratio, H/O is increased to at least 0.20 to thereby improve the fuel economy while retaining the abrasion resistance (JP-A 10-36703).

In another method, the method as described above is described as being insufficient in improving the fuel economy, and adjustment of oxygen content, concentration of weakly acidic group, concentration of basic functional group, and amount of rubber physically adsorbed of the carbon black into a particular range is proposed and such adjustment is accomplished by oxidizing hard carbon black with nitric acid, hydrogen peroxide, ozone or other strong oxidizing agent, or by oxidizing the carbon black by blowing water or steam into the reaction furnace and incorporating oxygen-containing functional group onto the surface of the carbon black to thereby increase the oxygen content, and thereafter heat treating the carbon black at a temperature of 1000° C. to 1500° C. (JP-A 11-60800).

JP-A 11-60800 discloses that the SBR rubber composition having such carbon black incorporated therein (Example) exhibited a tan $\delta$ value at 60° C. lower than that of the SBR rubber composition having the untreated carbon black incorporated therein (Standard Sample), and that the reduction in the value compared to the Standard Sample was 6 to 8%.

There is, however, still a demand for the rubber composition exhibiting even lower value of tan $\delta$ at 60° C.

The present invention has been accomplished in view of the situation as described above, and an object of the present invention is to provide a method for separating the structural member from a rubber composite material by dispersing the vulcanized rubber composition in the form of small pieces in a solvent, or by dissolving the vulcanized rubber composition in an organic solvent at room temperature and normal pressure; and a method for separating the rubber component and the filler component in a vulcanized rubber composition.

Another object of the present invention is to provide a simple, convenient method which is capable of separating structural members, or rubber components or filler components, from unvulcanized rubber composite materials and unvulcanized rubber compositions discarded mainly from factories as not being put into market, by means of a particular treatment irrespective of their form (whether they are integrated with other structural member, or whether they are hard or soft), and preferably with no preliminary separation.

Further object of the present invention is to provide a rubber composition which can be recovered from any rubber composition and which can be reused as a starting rubber in producing rubber compositions, and which enables production of rubber compositions of favorable properties when blended in the rubber composition.

Still further object of the present invention is to provide a carbon black which can be recovered from rubber compositions and which has unique feature which are not found in the carbon black used as the raw material; and a rubber composition containing such rubber composition which exhibits excellent damping properties.

Still further object of the present invention is to provide a carbon black which can be recovered from rubber compositions and which has a quality equivalent or better than that of the carbon black used as the raw material; and a rubber composition produced by incorporating such recovered carbon black which exhibits excellent physical properties.

Still further object of the present invention is to provide a method for producing a carbon black which maintains the rubber properties of the vulcanized rubber and which has retained the reinforcement action of a carbon black, and which has enabled to reduce the loss tangent (tan δ) at 60° C. by an unexpectable degree; the carbon black produced by such method; and the rubber composition and the vulcanized rubber containing such carbon black.

DISCLOSURE OF THE INVENTION

The inventors of the present invention have made an extensive study in search of a simple, convenient method capable of recovering rubber materials and structural members from a vulcanized rubber product at a low cost without using any thermal decomposition apparatus or heating apparatus, and then found that, when blocks of rubber composite material or vulcanized rubber composition are immersed in a large amount or organic solvent containing a small amount of a peroxide at normal temperature and normal pressure, the vulcanized rubber composition can be liquidified in the solvent and the filler component and the structural member can be separated. The first aspect of the present invention according to 1 to 13 as described below was thereby completed.

1. A method for separating a rubber composite material containing a vulcanized rubber composition and at least one structural member other than the vulcanized rubber composition wherein the rubber composite material is immersed in an organic solvent containing 0.01 to 50% of a peroxide with or without agitation to liquidity the vulcanized rubber composition for separation of the structural member, wherein said immersion is conducted such that the ratio of the rubber composite material (mg)/the organic solvent (ml) is up to 100.

2. A method for separating the rubber composite material according to the above 1 wherein said immersion with or without agitation,is conducted at a temperature of 0 to 40° C.

3. A method for separating the rubber composite material according to the above 1 or 2 wherein said rubber composite material is in the form of a block having at least one edge exceeding 2 mm.

4. A method for separating the rubber composite material according to any one of the above 1 to 3 wherein said separation is conducted by centrifugation, membrane separation, or decantation.

5. A method for separating the rubber composite material according to any one of the above 1 to 4 wherein said peroxide is selected from the group consisting of benzoyl peroxide, t-butyl hydroperoxide, diisopropylbenzene hydroperoxide, p-methane hydroperoxide, cumene hydroperoxide, and azobisisobutyronitrile.

6. A method for separating the rubber composite material according to any one of the above 1 to 5 wherein said vulcanized rubber composition is a vulcanized rubber composition containing at least 1 part by weight of carbon black and/or silica per 100 parts-by weight of the rubber component.

7. A method for separating a vulcanized rubber composition containing a vulcanized rubber and, at least, a filler wherein said vulcanized rubber composition is immersed in an organic solvent containing 0.01 to 50% of a peroxide with or without agitation to liquidify the vulcanized rubber composition for separation of the rubber component and the filler component in the vulcanized rubber composition, wherein said immersion is conducted such that the ratio of the vulcanized rubber composition (mg)/the organic solvent (ml) is up to 30.

8. A method for separating a vulcanized rubber composition containing a vulcanized rubber and, at least, a filler wherein the vulcanized rubber composition is immersed in an organic solvent containing 0.01 to 50% by weight of a peroxide with or without agitation to liquidify the vulcanized rubber composition for separation of the rubber component and the filler component in the vulcanized rubber compositions wherein said immersion is conducted such that the ratio of the vulcanized rubber composition (mg)/the organic solvent (ml) is up to 30, and wherein said method further comprises the steps of removing the separated filler component from the reaction system and adding further organic solvent to the reaction system.

9. A method for separating the vulcanized rubber composition according to the above 7 or 8 wherein said immersion with or without agitation is conducted at a temperature of 0 to 40° C.

10. A method for separating the vulcanized rubber composition according to any one of the above 7 to 9 wherein said vulcanized rubber composition is in the form of a block having at least one edge exceeding 2 mm.

11. A method for separating the vulcanized rubber composition according to any one of the above 7 to 10 wherein said separation is conducted by centrifugation, membrane separation, or decantation.

12. A method for separating the vulcanized rubber composition according to any one of the above 7 to 11 wherein said peroxide is selected from the group consisting of benzoyl peroxide, t-butyl hydroperoxide, diisopropylbenzene hydroperoxide, p-methane hydroperoxide, cumene hydroperoxide, and azobisisobutyronitrile.

13. A method for separating the vulcanized rubber composition according to any one of the above 7 to 12 wherein said vulcanized rubber composition is a vulcanized rubber composition containing at least 1 part by weight of carbon black and/or silica per 100 parts by weight of the rubber component.

The inventors of the present invention also made an extensive study in search of a simple, convenient method capable of recovering rubber materials and structural members from an unvulcanized scrap rubber at a low cost without using any thermal decomposition apparatus or heating apparatus, and then found that, when unvulcanized rubber composite material or unvulcanized rubber composition is immersed in an organic solvent containing a peroxide at normal temperature and normal pressure, the unvulcanized rubber composition can be liquidified in the solvent and the filler component and the structural member can be separated irrespective of the size, location, degree of crosslinking of the vulcanized portion in the unvulcanized scrap rubber. The second aspect of the present invention according to 14 to 21 as described below was thereby completed.

14. A method for separating an unvulcanized rubber composition comprising an unvulcanized rubber and at least a filler wherein the unvulcanized rubber composition is immersed in an organic solvent containing 0.01 to 50% by weight of a peroxide with or without agitation to liquidity the unvulcanized rubber composition for separation of the rubber component and the filler component in the unvulcanized rubber composition.

15. A method for separating the unvulcanized rubber composition according to the above 14 wherein said unvulcanized rubber composition is immersed in said organic solvent at a ratio of the unvulcanized rubber composition (mg)/the organic solvent (ml) of up to 30.

16. A method for separating an unvulcanized rubber composition containing an unvulcanized rubber and, at least, a filler wherein the unvulcanized rubber composition is immersed in an organic solvent containing 0.01 to 50% by weight of a peroxide with or without agitation to liquidity the unvulcanized rubber composition for separation of the rubber component and the filler component in the unvulcanized rubber composition, wherein said immersion is conducted such that the ratio of the unvulcanized rubber composition (mg)/the organic solvent (ml) is up to 30, and wherein said method further comprises the steps of removing the separated filler component from the reaction system and adding further unvulcanized rubber composition and/or organic solvent to the reaction system.

17. A method for separating the unvulcanized rubber composition according to any one of the above 14 to 16 wherein said immersion with or without agitation is conducted at a temperature of 0 to 40° C.

18. A method for separating the unvulcanized rubber composition according to any one of the above 14 to 17 wherein said unvulcanized rubber composition is in the form of a block having at least one edge exceeding 2 mm.

19. A method for separating the unvulcanized rubber composition according to any one of the above 14 to 18 wherein said separation is conducted by centrifugation, membrane separation, or decantation.

20. A method for separating the unvulcanized rubber composition according to any one of the above 14 to 19 wherein said peroxide is selected from the group consisting of benzoyl peroxide, t-butyl hydroperoxide, diisopropylbenzene hydroperoxide, p-methane hydroperoxide, cumene hydroperoxide, and azobisisobutyronitrile.

21. A method for separating the unvulcanized rubber composition according to any one of the above 14 to 20 wherein said unvulcanized rubber composition is an unvulcanized rubber composition containing at least 1 part by weight of carbon black and/or silica per 100 parts by weight of the rubber component.

The inventors of the present invention also developed a simple, convenient method capable of recovering the rubber component and the filler component of a vulcanized rubber composition separately at a low cost without using any thermal decomposition apparatus or heating apparatus, and when the liquid component recovered by such separation method was analyzed, it was unexpectedly found that a liquid rubber having a high molecular weight has been separated, and the rubber composition having such liquid rubber incorporated therein exhibits a hysteresis and loss tangent (tan δ) higher than the rubber composition having a starting rubber generally used as starting material incorporated therein. It was also found that the recovered rubber having such superior properties can be obtained not only from the vulcanized rubber composition, but also from unvulcanized rubber composition such as the unvulcanized scrap rubber inevitably produced in the process of producing vulcanized rubber product. The third aspect of the present invention according to 22 to 25 as described below was thereby completed.

22. A recovered rubber by immersing a rubber composition in an organic solvent containing 0.01 to 50% by weight of a peroxide with or without agitation to decompose said rubber composition, wherein said recovered rubber contains up to 5% by weight of decomposition product of said peroxide.

23. A recovered rubber by immersing a rubber composition in an organic solvent containing 0.01 to 50% by weight of a peroxide with or without agitation to decompose said rubber composition and subjecting the liquid product to a heat treatment at 100° C. to 160° C. for 5 minutes to 30 minutes, wherein said recovered rubber contains up to 5% by weight of decomposition product of said peroxide.

24. A recovered rubber according to the above 22 or 23 wherein said peroxide is benzoyl peroxide and said organic solvent is toluene.

25. A rubber composition containing the recovered rubber of any one of the above 22 to 24, and a rubber and/or a resin.

The inventors of the present invention also developed a simple, convenient method capable of recovering rubber component and the filler component of a vulcanized rubber composition separately at a low cost without using any thermal decomposition apparatus or heating apparatus, and when the carbon black recovered by such separation method was analyzed for the physical properties, it was unexpectedly found that the rubber composition having such carbon black incorporated therein exhibits unique properties and the rubber composition having such carbon black incorporated therein exhibits superior damping properties higher than the rubber composition having a starting rubber generally used as starting material incorporated therein. It was also found that the recovered carbon black having such superior properties can be obtained not only from the vulcanized rubber composition, but also from unvulcanized rubber composition such as the unvulcanized scrap rubber inevitably produced in the process of producing vulcanized rubber product. The fourth aspect of the present invention according to 26 to 29 as described below was thereby completed.

26. A recovered carbon black by decomposing a rubber composition containing at least a rubber and a carbon black.

27. A recovered carbon black according to the above 26 wherein said decomposition is conducted by immersing the rubber composition in an organic solvent containing 0.01 to 50% by weight of a peroxide with or without agitation to decompose said rubber composition, wherein said immersion is conducted such that the ratio of the rubber composition (mg)/the organic solvent (ml) is up to 30.

28. A recovered carbon black according to the above 27 wherein said peroxide is benzoyl peroxide and said organic solvent is toluene.

29. A rubber composition containing the recovered carbon black of any one of the above 26 to 28, and a rubber and/or a resin.

The inventors of the present invention also found that a rubber composition exhibiting low loss tan δ at 60° C. can be produced by subjecting the starting carbon black to a heat treatment under particular conditions, and the fifth aspect of the present invention according to 30 to 39 as described below was thereby completed.

30. A method for producing a carbon black comprising the step of heat-treating a virgin carbon black in a non-oxidizing atmosphere at a temperature of 300° C. to 1500° C. for at least 30 seconds in the presence of at least one rubber compound component selected from rubber and a vulcanization aid.

31. A method for producing the carbon black according to the above 30 wherein a vulcanizer is further comprised as a rubber compound component.

32. A method for producing the carbon black according to the above 30 or 31 wherein said virgin carbon black and said rubber compound component are mixed in an organic solvent to prepare a mixture solution followed by removal of said organic solvent, and the resulting dry product is subjected to said heat treatment.

33. A method for producing the carbon black according to any one of the above 30 to 32 wherein said rubber is a diene rubber.

34. A method for producing the carbon black according to any one of the above 30 to 33 wherein said vulcanization aid is zinc oxide and/or stearic acid.

35. A method for producing the carbon black according to any one of the above 30 to 34 wherein said vulcanizer is at least one member selected from sulfur, an organic peroxide, and a vulcanization accelerator.

36. A method for producing the carbon black according to any one of the above 30 to 35 wherein said method further comprises the step of producing a starting virgin carbon black.

37. A carbon black produced by the method for producing the carbon black of any one of the above 30 to 36 wherein said carbon black is capable of producing a rubber composition having a tan δ lower than the rubber composition produced by substituting the carbon black with a virgin carbon black of equivalent blend ratio.

38. A rubber composition containing the carbon black of the above 37.

39. A vulcanized rubber obtained from the rubber composition of the above 38.

The inventors of the present invention also found that the poor quality of the conventional recovered carbon black which has been recovered by heat treating a vulcanized rubber composition can be improved by conducting the heat treatment under predetermined conditions. To be more specific, the inventors found that, heat treatment was insufficient in the conventional recovery process since the process was conducted in an industrial scale by an industrial method wherein the vulcanized rubber composition of a large amount was treated at once; that the solid product recovered by decomposition of the vulcanized rubber composition or from the unvulcanized rubber composition itself can be sufficiently heat treated such that the amount of the organic components on the surface of the carbon black is equivalent or less than the amount of the organic components on the surface of a virgin carbon black normally employed as the starting material; and unexpectedly, that the rubber composition having incorporated such recovered carbon black therein has higher tensile strength (modulus) and lower loss tangent (tan δ) compared to the rubber composition having a virgin carbon black normally employed as the starting material incorporated therein. It was also found that the recovered carbon black having such superior properties can be obtained not only from the vulcanized rubber composition, but also from the solid product recovered by decomposition of the unvulcanized scrap rubber or other unvulcanized rubber composition inevitably produced in the process of producing vulcanized rubber product, or from the unvulcanized rubber composition itself. The sixth aspect of the present invention according to 40 to 43 as described below was thereby completed.

40. A recovered carbon black produced by heat-treating a solid recovered from a rubber composition containing at least a rubber and carbon black in a non-oxidizing atmosphere at a temperature of 300° C. to 1500° C. for at least 30 seconds, wherein amount of organic components on the surface of said carbon black is equivalent to or less than the amount of organic components on the surface of a virgin carbon black used for the starting material of the rubber composition.

41. A recovered carbon black according to the above 40 wherein said solid product has been recovered by immersing the rubber composition in an organic solvent containing 0.01 to 50% by weight of a peroxide with or without agitation, and wherein said immersion has been conducted such that the ratio of the rubber composition (mg)/the organic solvent (ml) is up to 30.

42. A recovered carbon black according to the above 31 wherein said peroxide is benzoyl peroxide and said organic solvent is toluene.

43. A rubber composition containing the recovered carbon black of any one of the above 30 to 32, and a rubber and/or a resin.

BEST MODE FOR CARRYING OUT THE INVENTION

Figure 1:
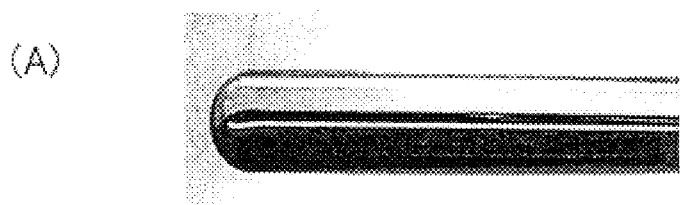
FIGS. 1 (A), (B), (C) and (D) are schematic views showing the vulcanized rubber composition in liquid state after the liquidification. Ratio of the vulcanized rubber composition (mg)/the organic solvent (ml) is different in (A), (B), (C), and (D).
Figure 1:
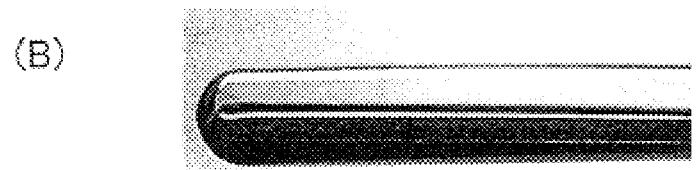
Figure 1:
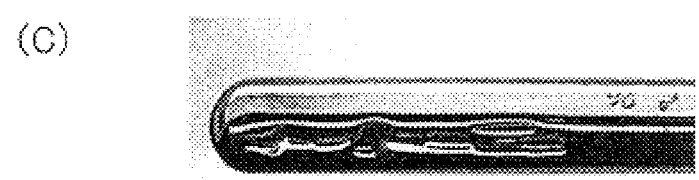
Figure 1:
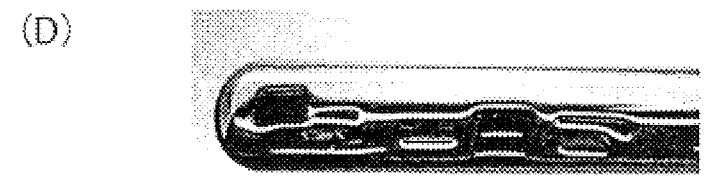

Next, the present invention is described in detail.

The present invention provides a method for separating a rubber composition or a rubber composite material. The rubber composition may be any rubber composition which may be either vulcanized or unvulcanized, and included are those which are partly vulcanize and those which are vulcanized to anlinsufficient degree.

<Rubber Composition>

The rubber composition (which is sometimes simply referred to as the rubber) contains a rubber (starting or virgin rubber) and, at least, a filler.

Exemplary rubbers which may be contained include rubbers such as natural rubber (NR), isoprene rubber (IR), styrene-butadiene rubber (SBR), butadiene rubber (BR), butyl rubber (IIR), and chloroprene rubber (CR), and blend of such rubbers.

Exemplary fillers are conventional known fillers such as carbon black, silica, zinc oxide, and calcium carbonate, and the preferred are carbon black and silica.

Amount of the filler blended is preferably 1 parts by weight or more, and more preferably, 10 to 130 parts by weight per 100 parts by weight of the rubber component.

The rubber composition generally contain a vulcanizer such as sulfur; non-elemental sulfur vulcanizers such as tetramethylthiuram disulfide and tetraethylthiuram disulfide; bismorpholine disulfide, dipentamethylenethiuram tetrasulfide, organic peroxide, quinone dioxime, phenolformaldehyde resin, a mixture of nitroso compound and diisocyanate, zinc oxide, magnesium oxide, zinc peroxide, triethylenetetramine, methylene dianiline, diphenylguanidine, hexamethylebediamine carbamate, ethylenediamine carbamate, and bis-p-aminocyclohexylmethane carbamate.

In addition to the starting rubber, the vulcanizer and the filler, the rubber composition may contain a wide variety of other conventional resins, elastomers, other compounding ingredients, and rubber subsidiary materials such as vulcanization (curing) accelerator, vulcanization aid, activating agent, vulcanization retarder, softener, plasticizing agent, adhesive, tackifier, vulcanizer, foaming agent, foaming aid, reinforcing agent, antiaging agent, colorant, pigment, flame retardant, and mold release agent, which may be incorporated during the kneading, the vulcanization, the addition the filler, or any other step in the production.

<Liquidification Solution>

In the present invention, a vulcanized rubber, an unvulcanized rubber or a rubber composite material obtained from the rubber composition as described above is liquidified (decomposed) by using an organic solvent containing a peroxide.

The organic solvent used may be any conventional organic solvent which is liquid at normal pressure and normal temperature and capable of dissolving the peroxide. Typical such organic solvents include hydrocarbons and alcohols. The hydrocarbon used may be either a saturated or an unsaturated hydrocarbon which may be aromatic, aliphatic, or alicyclic. Exemplary such organic solvents include benzene, toluene, xylene, hexane, decalin (decahydronaphthalene), methanol, ethanol, tetralin (tetrahydronaphthalene), and cyclohexane.

The alcohols as described above may contain water as in the case of commercially available alcohols, and it is also possible to use the one which has been further diluted with water. Water content of the alcohol is not particularly limited as long as the alcohol (aqueous solution of the alcohol) acts as an organic solvent. The alcohol concentration, however, is preferably at least 80%.

Among these, the preferred are those which are capable of swelling a vulcanized rubber composition or an unvulcanized rubber composition at room temperature, and use of an aromatic hydrocarbon such as toluene, benzene, and xylene is preferable.

The peroxide used may be any of known organic peroxides, and exemplary such peroxides include benzoyl peroxide, diisopropylbenzene hydroperoxide (e.g. product name, Percumyl P, manufactured by Nippon Oil & Fats Co. Ltd.), t-butyl hydroperoxide (e.g. 80% di-t-butylperoxide solution), p-methane hydroperoxide (e.g. product name, Permentha H, manufactured by Nippon Oil & Fats Co. Ltd.), cumene hydroperoxide (e.g. product name, Percumyl H-80, manufactured by Nippon Oil & Fats Co. Ltd.) and other organic peroxides as well as radical generators such as azobisisobutyronitrile. Such peroxide may contain water or the like for the purpose of preventing explosion.

Among these, the particularly preferred is benzoyl peroxide.

The solution used in the present invention for solubilizing the vulcanized rubber composition or the unvulcanized rubber composition may be the organic solvent containing the peroxide at a concentration of 0.01 to 50%, preferably at 0.1 to 10%, and more preferably at 0.5 to 2% since the concentration within such range results in an efficient promotion of the reaction. The solution may contain two or more types of the organic solvents and/or the peroxides.

Preferable solution used in the present invention is solution of benzoyl peroxide in toluene at a concentration of 0.01 to 50%. The solution comprising the organic solvent and the peroxide may optionally contain other components to the extent that does not adversely affect the purpose of the present invention.

An organic peroxide such as benzoyl peroxide is generally provided with a solvent such as water impregnated therein for the purpose of preventing explosion and the like. Therefore, the step of water removal can be omitted if the water content of the organic peroxide is removed before its addition to the organic solvent, or if the risk reduction by way of preliminarily dissolving the organic peroxide in the organic solvent as described above is adopted.

<Method for Separating Vulcanized Rubber>

First aspect of the present invention is directed to a method for separating a vulcanized rubber composition or a rubber composite material.

In the first embodiment according to this aspect of the present invention, a rubber composite material containing a vulcanized rubber composition, and at least, one another structural member is immersed with or without agitation in the solution as described above comprising an organic solvent containing 0.01 to 50% of a peroxide to thereby liquidify the vulcanized rubber composition. Separation of the structural member is thereby enabled.

The rubber composite material used herein comprises a vulcanized rubber composition and at least one structural member, for example, a steel member as in the case of a brass-plated steel cord or an organic fiber as in the case of a polyester carcass cord. Exemplary such rubber composite materials include rubber products such as natural rubber tire, synthetic rubber tire, cable, belt, hose, sheet, packing, and scrap rubber generated in the molding, and use of the wastes of such rubber products is preferable.

In the first embodiment, the rubber composite material is immersed with or without agitation in the solution containing a peroxide as described above, and in this procedure, the immersion with or without agitation is carried out such that the ratio of the rubber composite material to the organic solvent, namely, the rubber composite material (mg)/organic solvent (ml) is 100 or less, preferably 50 or less, and more preferably 10 or less. The ratio in excess of 100 is not preferable since a completely different mechanism will be actuated in the process of liquidification of the vulcanized rubber composition in the solution at such ratio, and separation of the structural member from the rubber composite material will not be accomplished.

In the first embodiment, it is postulated that the separation of the rubber component and the filler component in the vulcanized rubber composition takes place either before, during or after the separation of the constituent member other than the rubber composition from the rubber composite material.

Accordingly, mechanism and other preferable conditions of the liquidification of the vulcanized rubber composition in the first embodiment are the same as those of the method for separating the vulcanized rubber composition according to the second and third embodiment of the present invention as described below. The mechanism and the preferable conditions are described in the second and the third embodiment.

In the second embodiment, the vulcanized rubber composition as described above is immersed with or without agitation in the solution containing 0.01 to 50% of the peroxide such that the ratio of the vulcanized rubber composition (mg)/organic solvent (ml) is 30 or less, preferably 15 or less, and more preferably 5 or less to liquidify the vulcanized rubber composition in the solution. The rubber component and the filler component-in the vulcanized rubber composition are thereby separated.

The third embodiment has an additional step of removing the separated filler component from the reaction system, and at the same time, adding the liquidification solution as described above to the reaction system along with the liquidification of the vulcanized rubber composition in the second embodiment.

In the separation of the vulcanized rubber composition according to the second and third embodiment of the present invention, the vulcanized rubber composition is immersed with or without agitation in the organic solvent containing a peroxide as described above. In this process, the immersion with or without agitation is carried out such that the ratio of the vulcanized rubber composition to the organic solvent, namely, vulcanized rubber composition (mg)/organic solvent (ml) is 30 or less, preferably 15 or less, and more preferably 5 or less.

As described above, the vulcanized rubber composition which is liquidified in this invention has a filler blended at a content of preferably at least 1 part by weight, and more preferably 10 to 130 parts by weight per 100 parts by weight of the rubber component.

In this invention, a vulcanized rubber composition having a filler blended therein, and in particular, a vulcanized rubber composition having carbon black and/or silica blended as the filler as in the case of waste tires is liquidified in a more preferable manner although the reason for such tendency is unknown. This tendency persuasively demonstrates the tremendous value that is associated with the separation method of this invention since most industrial rubbers currently in use have a filler such as carbon black blended therein.

Next, liquidification mechanism of the vulcanized rubber composition according to the first to third embodiments is explained in detail by comparison with "Decomposition of Vulcanized Rubbers in a Solvent by Air Oxidation", Journal of Japan Rubber Association 49 (1976) pages 829 to 836.

The first to third embodiments of the present invention and "Decomposition of Vulcanized Rubbers in a Solvent by Air Oxidation" in the Journal of Japan Rubber Association may at a first glance look the same in that the vulcanized rubber is treated in an organic solvent containing benzoyl peroxide.

However, ratio of the vulcanized rubber powder (mg)/the organic solvent (ml) is 71.4 to 250 in the method described in the Journal of Japan Rubber Association whereas the ratio of the vulcanized rubber composition (mg)/organic solvent (ml) is 30 or less in the separation method of this invention, and this is a large difference. In addition, temperature of the treatment is 70 to 100° C. in the method described in the Journal of Japan Rubber Association while such high temperature is not required in the separation method of this invention, and the liquidification is carried out at 0 to 40° C. near the room temperature, and this is also a marked difference. In other words, this invention requires neither a large amount of organic solvent in relation to the vulcanized rubber composition nor high treatment temperature.

The inventors of the present invention believe that such differences are not caused by the concentration or temperature used, but should the result of a quite different liquidification mechanism in the vulcanized rubber composition.

FIG. 1 shows how the vulcanized rubber composition dissolved when it was immersed in 5 ml of toluene containing 1% of benzoyl peroxide at different ratios of the vulcanized rubber composition (mg)/the organic solvent (ml) for 2 days. The vulcanized rubber composition used in each case was the one containing 50 parts by weight of carbon black per 100 parts by weight of natural rubber. (A) shows the liquidification example A wherein the ratio is 5, (B) shows the liquidification example B wherein the ratio is 25, (C) shows the liquidification example C wherein the ratio is 50, and (D) shows the liquidification example D wherein the ratio is 75.

As evident from FIG. 1, the liquidification example A wherein the ratio was 5 and the liquidification example B wherein the ratio was 25 were in the state of non-viscous solutions wherein the vulcanized rubber composition had completely dissolved. When these solutions were allowed to stand, the solution separated into transparent solution phase comprising the rubber component and the carbon black precipitate, and the carbon black, namely, the filler component could be readily separated from the rubber component by such means as centrifugation. On the other hand, the liquidification example C wherein the ratio was 50 and the liquidification example D wherein the ratio was 75 were viscous product not in the state of solution with some parts left undissolved. This state did not change after leaving for 7 days. When these solutions were allowed to stand, the solution did not separate into transparent solution phase comprising the rubber component and the carbon black precipitate, and the carbon black could be readily separated from the rubber component. In other words, with regard to the decomposition in a solvent by air oxidation according to the Journal of Japan Rubber Association, "the vulcanized rubber decomposes by oxidation, and the reaction product is a viscous plastic substance which is soluble in the solvent and the organic solvent used" as described in page 829, and "the reaction product is a soft, rubber-like tacky substance which has chlorine from solvent added thereto by radical chain transfer" as described in page 830. This reaction product refers to the state wherein the solvent after the treatment is a highly viscous rubber-like product which can be stirred, and separation of the structural member or the filler component from such product is almost impossible.

On the other hand, the liquidification of the vulcanized rubber composition (or the unvulcanized rubber composition as described below) of this invention refers to the state where blocks of the vulcanized rubber composition has either become a fine powder or dissolved in the liquidification solution to take the appearance of a liquid, and as a consequence, the vulcanized rubber is in the form of very fine particles dispersed in the solvent used as the liquidification solution and the resulting solution takes an appearance of a non-viscous solvent. Although the precise mechanism is yet unknown, it is conceived that the molecular chains of the vulcanized rubber has been cleaved and molecular weight has reduced along with introduction of polar groups. To be more specific, the rubber with its molecular chains cleaved may be present in the solution in solid state in the form of minute blocks, dispersed in the solution as fine particles, or dissolved in the solution as low molecular weight-molecules.

Figure 3:
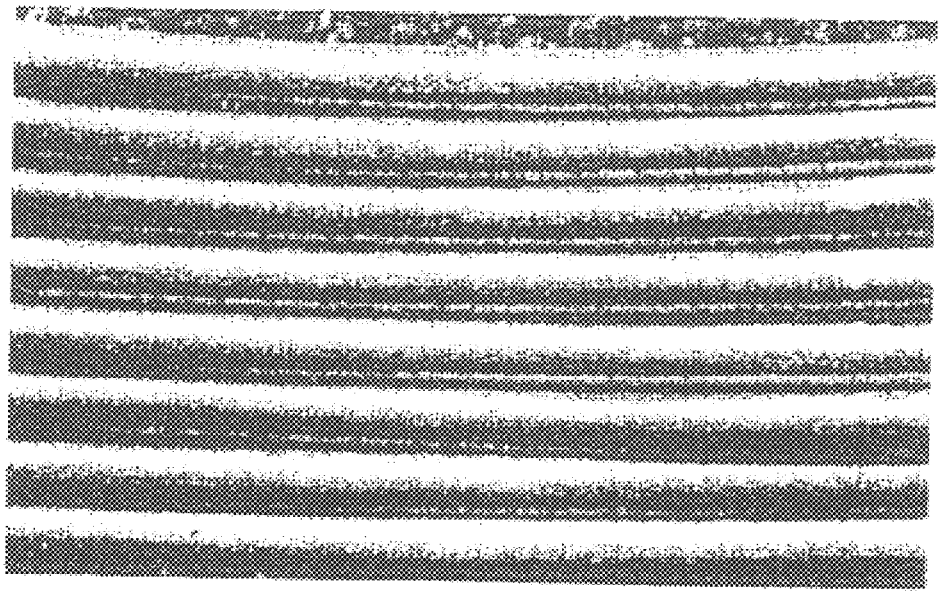
FIG. 3 is a schematic view showing the conditions of the cord member (steel cord) after separation of the rubber components from a tire material in Example 1-5.
Figure 4:
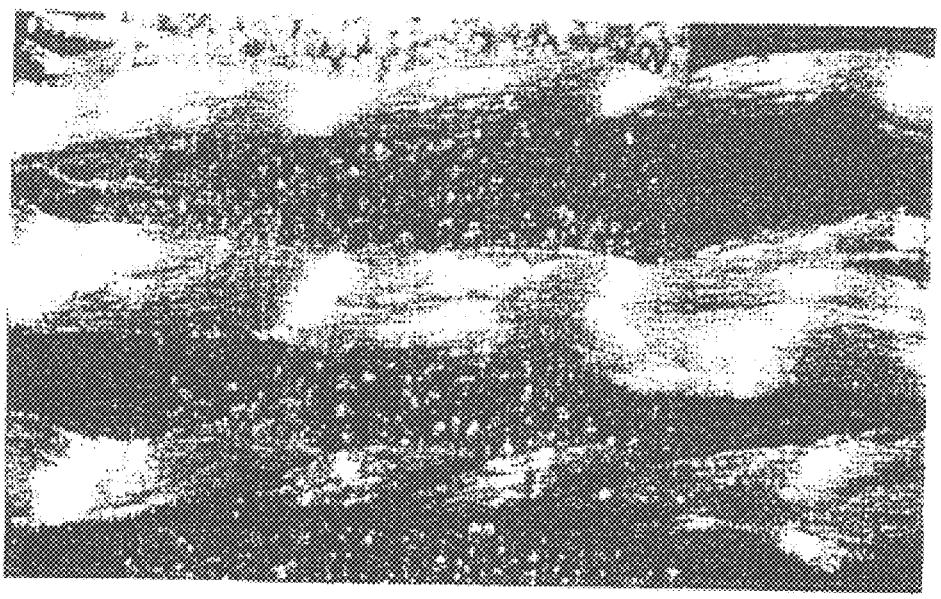
FIG. 4 is a schematic view showing the conditions of the cord member (carcass cord (PET) ) after separation of the rubber components from a tire material in Example 1-5.

As a consequence, when the rubber composite material wherein the vulcanized rubber composition together with other structural member such as reinforcement has been vulcanized is treated by the method of the present invention, the structural member can be readily separated from the vulcanized rubber in the form of non-viscous liquid by any conventional separation means such as centrifugation, membrane separation, decantation, or filtration as shown in FIGS. 3 and 4, which shows the results of the Examples as will be described below.

The article in the Journal of Japan Rubber Association also describes that, among the vulcanized rubber composition, those containing carbon black is less likely to be oxidatively decomposed since the carbon black acts as an oxidation suppressor (page 831).

On the other hand, in the case of the separation method of this invention, a vulcanized rubber composition containing a filler such as carbon black or silica is more susceptible to decomposition compared to the vulcanized rubber composition containing no filler, and it should be understood that this also indicates the difference in the mechanism of the method of the present invention from the reaction mechanism of the oxidative decomposition of the vulcanized rubber described in the article in the Journal of Japan Rubber Association.

This invention is capable of liquidifying the vulcanized rubber composition into a non-viscous solution by separating the filler particles such as carbon black from the rubber component and dispersing the particles in the liquidification solution; or by suspending the filler particles in the liquidification solution with the rubber component attached to the surface of the filler particles.

According to the method of this invention, the filler component such as carbon black can be readily separated from the non-viscous suspension as shown in FIG. 2(A), which shows the results of the Example as will be described below, either in the state completely separated from the rubber component, or in the state with the rubber component attached on their surface by any conventional separation means such as centrifugation, membrane separation, decantation, or filtration as shown, for example, in FIG. 2(B).

This enables the separation method according to the third embodiment of the present invention wherein the step of removing the separated filler component from the reaction system is conducted during the liquidification step of the vulcanized rubber composition in the liquidification solution.

In this case, the step of removing the separated filler component can be incorporated either once or repeatedly, and either continuously or intermittently in the step of liquidifying the vulcanized rubber composition. Removal of the already separated filler component from the reaction system before the complete liquidification of the vulcanized rubber composition enables earlier removal of the filler component from the reaction system. The step of adding fresh liquidification solution to the reaction system as described-above can be incorporated either once or repeatedly, and either continuously or intermittently in the step of liquidifying the vulcanized rubber composition. Further addition of the liquidification solution to the reaction system promotes liquidification reaction of the vulcanized rubber composition.

Furthermore, the method described in the Journal of Japan Rubber Association employs a rubber powder having a particle size of 840 $\mu$m or less, and a rubber powder having a particle size of 840 $\mu$m to 2 mm.

In contrast, separation of the vulcanized rubber from the filler and/or other structural members is more readily accomplished in this invention when the rubber composite material or the vulcanized rubber composition is in the form of blocks having at least one edge in excess of 2 mm compared to the case of the so called powder rubber which has been sheared until the rubber is in the form of powder having a particle size of 2 mm or less.

The reason for the failure of the powder rubber described in the Journal of Japan Rubber Association is not fully clarified. It is, however, elucidated that the shearing results in the increased surface area of the vulcanized rubber composition, and also, in the high degree of surface oxidation of the composition in advance, and the liquidification is thereby delayed.

Accordingly, the rubber composite material or the vulcanized rubber composition treated in the first to third embodiments of the present invention is preferably the one which has not been sheared and the one in the form of blocks having at least one edge in excess of 2 mm, preferably having edges in the range of 2 to 40 mm, and more preferably having edges in the range of 2.5 to 10 mm, although the shape is not particularly limited. When the size of the blocks is in such range, the vulcanized rubber composition will be readily liquidified and finely divided without shearing.

In the first to third embodiments of the present invention, liquidification of the vulcanized rubber composition is accomplished by immersing the vulcanized rubber composition with or without agitation in the liquidification solution at the ratio as described above. The liquidification, however, may be accomplished by any method selected depending on the shape of the rubber composite material or the vulcanized rubber composition, for example, by allowing a large amount of the liquidification solution to flow along the surface, or by spray coating.

In the separation method of the first to third embodiments of the present invention, the rubber composite material or the vulcanized rubber composition is brought in contact with the liquidification solution for a time period which may vary depending on the type of vulcanized rubber, the type of solvent, the concentration of peroxide, or the like. For example, when 1% toluene solution of benzoyl peroxide is employed, the vulcanized natural rubber having carbon black blended therein is immersed in the solution with or without agitation generally for about 40 to 50 hours, and preferably, for about 60 to 70 hours.

In the first to third embodiments of the present invention, the liquidification solution may be heated to a temperature not too hot to thereby reduce the time required for the liquidification in the immersion of the rubber composite material or the vulcanized rubber composition in the liquidification solution with or without agitation. Even when the liquidification solution is too hot, the structural member and/or the filler component can be separated by liquidifying the vulcanized rubber composition although there is some risk that the vulcanized rubber composition will remain partly undissolved due to decomposition and consumption of the peroxide in the liquidification solution at an early stage. In view of such situation, the immersion with or without agitation is preferably accomplished at a temperature of 0 to 40° C., preferably at 10 to 30° C., and most preferably at an ambient temperature.

In the first to third embodiments of the present invention, the structural member may be preliminarily separated from the rubber composite material in accordance with the separation method of the rubber composite material according to the first embodiment of the present invention, and then, the rubber component and the filler component may be separated in accordance with the separation method of the vulcanized rubber composition according to the second or third embodiment of the present invention. Alternatively, the structural member, the rubber component, and the filler component may be simultaneously separated from the rubber composite material.

In this invention, a suspension containing carbon black is obtained when, for example, a tire-grade vulcanized natural rubber having carbon black blended therein is immersed in 1% solution of benzoyl peroxide in toluene for 3 days at normal temperature and at normal pressure. The rubber component separated from such suspension as a toluene-soluble content has a weight average molecular weight (Mw) of about 15000. Such rubber component is useful as a liquid polymer.

In the analysis by gas chromatography and TGA, the solid content separated from the suspension contained carbon black and a small amount of rubber component (for example, at the carbon black:rubber weight ratio of about 100:20). Such carbon black can be used for blending in tires with no further separation of the rubber content.

As described above, this invention has enabled simple, convenient recovery of the structural members and the fillers from waste!tires, waste of cable-coating rubbers and other rubber composite materials without using large-scale installation such as thermal decomposition apparatus.

The thus recovered structural member and the filler may be used as a rubber subsidiary material for constituting industrial rubbers, or by blending in industrial rubbers. On the other hand, the rubber component separated usually has a weight average molecular weight (Mw) of up to 20000, and such rubber component is quite useful as a liquid polymer.

It is also possible to separate different types of vulcanized rubbers by utilizing difference in solubility in the above-described organic solvent. For example, in the case of a laminate of vulcanized natural rubber (NR) and butyl rubber (IIR) liner, solubility of the vulcanized natural rubber in the vulcanized rubber-liquidification solution is higher than that of the butyl rubber, and the vulcanized natural rubber is selectively liquidified. As a consequence, the vulcanized natural rubber is separated as a liquid product while the butyl rubber is separated substantially leaving the solid liner form.

<Method for Separating Unvulcanized Rubber>

Second aspect of the present invention is directed to a method for separating an unvulcanized rubber composition or a rubber composite material according to fourth to sixth aspect of the invention.

The fourth embodiment according to the present invention is directed to a method for separating an unvulcanized rubber composition comprising an unvulcanized rubber and at least a filler wherein the unvulcanized rubber composition is immersed in a liquidification solution, namely, in an organic solvent containing 0.01 to 50% by weight of a peroxide with or without agitation to liquidity the unvulcanized rubber composition in the liquidification solution for separation of the rubber component and the filler component in the unvulcanized rubber composition.

The fifth embodiment according to the present invention is directed to a method for separating an unvulcanized rubber composition of the fourth embodiment which has an additional step of removing the separated filler component from the reaction system, and at the same time, adding the unvulcanized rubber composition and/or the liquidification solution as described above to the reaction system along with the liquidification of the unvulcanized rubber composition in the fourth embodiment.

The sixth embodiment according to the present invention is directed to a method for separating an unvulcanized rubber composite material comprising an unvulcanized rubber and at least one structural member wherein the unvulcanized rubber composite material is immersed in a liquidification solution, namely, in an organic solvent containing 0.01 to 50% by weight of a peroxide with or without agitation to liquidify the unvulcanized rubber composition in the liquidification solution for separation of the rubber component and the structural member.

The term 'unvulcanized rubber' includes any of the rubber composition as described above which is in the incompletely vulcanized state before the vulcanized rubber products including the rubber composition which is incompletely vulcanized, partly vulcanized, crosslinked to a low degree, and which is not at all vulcanized. The 'unvulcanized rubber' therefore includes unvulcanized rubbers and unvulcanized scrap rubbers which are generally used in the art in industrial scale production.

In other words, the 'unvulcanized rubber' of this invention includes both those described in the item of "unvulcanized waste rubber" in "Rubber Glossary" (Japan Rubber Association), namely, the "a general designation of the waste rubber before vulcanization most of which are waste rubbers from factories such as refinery waste and processing waste. Included are rubber compounds, compounds having compounding ingredients partly blended therewith, those lined with a fabric, pieces of mixed compound of natural rubber or synthetic rubber, and coagulated latex", and "unmolded or molded rubber before vulcanization" in the item of "unvulcanized rubber" in "Polymer Dictionary" (Society of Polymer).

Accordingly, exemplary unvulcanized rubber compositions preferably used in the separation method of this invention include scrap rubbers which were not put into market, for example, rubber scraps and defective rubber products discarded in various steps of producing the vulcanized rubber products such as natural rubber tire, synthetic rubber tire, cable, belt, hose, sheet, packing and other vulcanized rubber products due to early vulcanization, uneven vulcanization (yellowing or scorching), and the so called sagging.

The unvulcanized rubber composition at least contains a filler in addition to the unvulcanized rubber as described above. Of the fillers as described above, the preferred is carbon black since use of carbon black enables favorable liquidification of the unvulcanized rubber composition compared to those containing a filler other than carbon black.

The reason why such favorable liquidification is achieved in the unvulcanized rubber composition containing carbon black as the filler is yet unknown. However, this does indicate the tremendous value associated with the separation method of this invention since most industrial rubbers currently in production uses carbon black.

In the sixth embodiment of the present invention, an unvulcanized rubber composite material comprising the unvulcanized rubber composition as described above and at least one structural member is employed. Examples of such structural member include a steel member as in the case of a brass-plated steel cord and an organic fiber as in the case of a polyester carcass cord.

Exemplary such unvulcanized rubber composite materials include rubber scraps and defective rubber products discarded in various steps in producing the vulcanized rubber products such as natural rubber tire, synthetic rubber tire, cable, belt, hose, sheet, packing and other vulcanized rubber products due to early vulcanization, uneven vulcanization (yellowing or scorching), and the so called sagging.

When the unvulcanized rubber composition is liquidified by using a peroxide-containing organic solvent for the liquidification solution in the fourth to sixth embodiments according to the present invention, the unvulcanized rubber composition and/or the unvulcanized rubber composite material is immersed with or without agitation in the liquidification solution.

The unvulcanized rubber composition liquidifies in this process. The mechanism of the liquidification of the unvulcanized rubber composition is described in the following.

As in the case explained for the liquidification of the vulcanized rubber composition, the liquidification of the unvulcanized rubber composition of this invention refers to the state where the unvulcanized rubber composition, irrespective of its forms or inclusion of vulcanized portion, has either become a fine powder or dissolved in the lilquidification solution to take the appearance of a liquid, and as a consequence, the vulcanized rubber is in the form of very fine particles dispersed in the solvent used as the liquidification solution and the resulting solution takes an appearance of a non-viscous solvent. Although the precise mechanism is yet unknown, it is conceived that the molecular chains of the vulcanized rubber has been cleaved and molecular weight has reduced along with introduction of polar groups. To be more specific, the rubber with its molecular chains cleaved may be present in the solution in solid state in the form of minute blocks, dispersed in the solution as fine particles, or dissolved in the solution as low molecular weight-molecules.

This invention is capable of liquidifying the unvulcanized rubber composition into a non-viscous solution as in the case of the vulcanized rubber composition as described above. As a consequence of such liquidification of the unvulcanized rubber composition, the filler particles such as carbon black is separated from the rubber component and the particles are dispersed in the liquidification solution; or the filler particles are suspended in the liquidification solution with the rubber component attached to the surface of the filler particles. According to the method of this invention, the filler component such as carbon black can be readily separated from the non-viscous suspension either in the state completely separated from the rubber component, or in the state with the rubber component attached on their surface by any conventional separation means such as centrifugation, membrane separation, decantation, or filtration.

In order to facilitate the separation between the rubber component and the filler component in this stage, the immersion with or without the agitation is carried out at the ratio of the unvulcanized rubber composition to the organic solvent, namely, the unvulcanized rubber composition (mg)/ the organic solvent (ml) of preferably up to 30, more preferably up to 15, and most preferably up to 5.

This enables the method for separating the unvulcanized rubber composition according to the fifth embodiment of the present invention wherein the step of removing the separated filler component from the reaction system is added to the liquidification step of the unvulcanized rubber composition in the liquidification solution.

In this case, the step of removing the separated filler component can be conducted either once or repeatedly, and either continuously or intermittently during the step of liquidifying the, unvulcanized rubber composition. Removal of the already separated filler component from the reaction system before the complete liquidification of the unvulcanized rubber composition enables, earlier removal of the filler component from the reaction system. The step of further adding the unvulcanized rubber composition to the reaction system or the step of adding fresh liquidification solution to the reaction system as described above can be incorporated either once or repeatedly, and either continuously or intermittently in the step of liquidifying the unvulcanized rubber composition. Further addition of the unvulcanized rubber composition or the liquidification solution to the reaction system enables separation of an increased amount of the unvulcanized rubber composition and promotion of the liquidification reaction of the unvulcanized rubber composition.

In the sixth embodiment, when the unvulcanized rubber composite material treated is the one wherein the unvulcanized rubber composition together with the structural member such as a reinforcement has been partly vulcanized, or the one wherein whole composite material has been vulcanized to a low degree, the structural member can be readily separated as described above from the unvulcanized rubber in the form of a non-viscous suspension by any conventional separation means such as centrifugation, membrane separation, decantation, or filtration.

In order to facilitate the separation of the structural member in this stage, the immersion with or without the agitation is carried out at the ratio of the unvulcanized rubber composite material to the organic solvent, namely, the unvulcanized rubber composite material (mg)/the organic solvent (ml) of preferably up to 100, more preferably up to 50, and most preferably up to 10.

In the sixth embodiment, it is postulated that the separation of the rubber component and the filler component in the unvulcanized rubber composition takes place either before, during, or after the separation of the constituent member from the unvulcanized rubber composite material.

The unvulcanized rubber composite material or the unvulcanized rubber composition treated in the fourth to sixth embodiments of the present invention is not particularly limited for its shape, and preferably, the material or the composition is the scrap unvulcanized rubber or the scrap rubber as generated with no further treatment. However, the material or the composition may be cut into blocks having at least one edge in excess of 2 mm, preferably having edges in the range of 2 to 40 mm, and more preferably having edges in the range of 2.5 to 10 mm, although the shape is not particularly limited. When the size of the blocks is in such range, the unvulcanized rubber composition will be readily liquidified and cutting can be readily completed.

In the fourth to sixth embodiments of the present invention, liquidification of the unvulcanized rubber composition is accomplished by immersing the unvulcanized rubber composition or the unvulcanized rubber composite material with or without agitation in the liquidification solution at the ratio as described above. The liquidification, however, may be accomplished by any method selected depending on the shape of the unvulcanized rubber composition or the unvulcanized rubber composite material, for example, by allowing a large amount of the liquidification solution to flow along the surface, or by spray coating.

In the fourth to sixth embodiments of the present invention, the liquidification solution may be heated to a temperature not too hot to thereby reduce the time required for the liquidification in the immersion of the unvulcanized rubber composition or the unvulcanized rubber composite material in the liquidification solution with or without agitation. Even when the liquidification solution is too hot, the structural member and/or the filler component can be separated by liquidifying the unvulcanized rubber composition, although there is some risk that the unvulcanized rubber composition will remain partly undissolved due to decomposition and consumption of the peroxide in the liquidification solution at an early stage. In view of such situation, the immersion with or without agitation is preferably accomplished at a temperature of 0 to 40° C., preferably at 10 to 30° C., and most preferably at an ambient temperature.

In the fourth and fifth embodiments of the present invention, the structural member may be preliminarily separated from the unvulcanized rubber composite material in accordance with the sixth embodiment of the present invention, and then, the rubber component and the filler component may be separated in accordance with the fourth or fifth embodiment of the present invention. Alternatively, the structural member, the rubber component, and the filler component may be simultaneously separated from the Unvulcanized rubber composite material.

In the fourth to sixth embodiments of the present invention, the unvulcanized rubber composition or the unvulcanized rubber composite material is brought in contact with the liquidification solution for a time period which may vary depending on the type of unvulcanized rubber, the type of solvent; the concentration of peroxide, and the like. For example, when 1% toluene solution of benzoyl peroxide is employed, the scrap unvulcanized rubber having carbon black blended therein generated in the tire factory may be immersed in the solution with or without agitation generally for about 3 days, and preferably, for about 4 days.

In this invention, a suspension containing carbon black is obtained when, for example, a tire-grade natural rubber composition having carbon black blended therein generated in tire factories as waste unvulcanized rubber is immersed in 1% by weight solution of benzoyl peroxide in toluene for 3 days at normal temperature and at normal pressure. The rubber component separated from such suspension as a toluene-soluble content has a weight average molecular weight (Mw) of about 10000. Such rubber component is useful, as a liquid polymer.

In the analysis by gas chromatography and TGA, the solid content separated from the suspension contained carbon black and a small amount of rubber component (for example, at the carbon black rubber weight ratio of about 100:20). Such carbon black can be used for blending in seismic isolation rubbers and tires with no further separation of the rubber content.

As described above, this invention has enabled simple, convenient recovery of the rubber component, the filler component, and the structural member from scrap unvulcanized rubbers discarded mainly from the factories producing rubber products such as tires and cable-coating rubbers without using large-scale installation such as thermal decomposition apparatus.

As described above, the separation method of this invention is capable of separating the structural member, and also, the rubber component and the filler component with no complicated steps such as removal of the reinforcement or other structural member or removal of the vulcanized portion, and with no separation step irrespective of the shape of the unvulcanized rubber composite material or the unvulcanized rubber composition.

The thus recovered structural member and the filler may be used as a rubber subsidiary material for constituting industrial rubbers, or by blending in industrial rubbers. On the other hand, the rubber component separated usually has a weight average molecular weight (Mw) of up to 20000, and such rubber component is quite useful as a liquid polymer.

<Recovered Rubber and Rubber Composition Thereof>

The third aspect of the present invention is directed to a recovered rubber by the rubber composition separation method or the rubber composite material separation method as described above, and a rubber composition containing such recovered rubber.

The recovered rubber of this invention is the rubber produced by immersing a rubber composition in an organic solvent containing 0.01% by weight to 50% by weight of a peroxide with or without agitation, and the rubber produced by the decomposition of the rubber composition contains the peroxide decomposition product at an amount of up to 5% by weight. In this invention, the starting rubber composition which is the raw material for the recovered rubber may be any of the rubber composition as described above, and included are the rubber compositions which are vulcanized, which are not vulcanized (unvulcanized), which are partly vulcanized, and which are insufficiently vulcanized.

Typical vulcanized rubber compositions include automobile tire, cable, sheet, packing, scrap rubber produced in the molding, hose, belt, and various other rubber products, which may optionally contain a structural member other than the vulcanized rubber composition, for example, a steel member as in the case of a brass-plated steel cord or an organic fiber as in the case of a polyester carcass cord.

Accordingly, the unvulcanized rubber composition is not limited to any particular type as long as it is a rubber composition which includes at least some parts where degree of the vulcanization is below the degree required for a vulcanized rubber product. A typical example of such unvulcanized rubber composition is the rubber scraps discarded from the factory of the vulcanized rubber products, for example, rubber scraps discarded in the step of kneading or molding due to early vulcanization or uneven vulcanization (yellowing or scorching), and defective rubber products discarded due to the so called sagging in the vulcanization step. These unvulcanized rubber scraps may also contain a structural member such as steel member or organic fiber as described above.

These rubber compositions may also contain a rubber, a filler and the like which are contained in the rubber composition of the present invention as described below. The filler contained is preferably carbon black in view of favorable decomposition of the rubber composition as described below.

In this invention, the recovered rubber of the invention is obtained either by decomposing the rubber composition and subsequently recovering the rubber, or by decomposing the rubber composition and recovering the rubber at once.

The decomposition of the rubber composition is conducted by immersing the rubber composition in an organic solvent containing a peroxide at a content of 0.01% by weight to 50% by weight with or without agitation. This process of decomposition is as described above in the preceding part, and the description is not repeated.

In this invention, the rubber composition is decomposed as described above, and the solid content such as the filler, the structural member comprising the steel or the resin, and the like are removed from the resulting solution. The separation of the solid content may be accomplished by any of conventional means such as centrifugation, membrane separation, and filtration.

The liquid which is recovered after the removal of the solid content contains the rubber which has been liquidified, and also, the organic solvent and the peroxide used for the liquidification solution and the decomposition product of the peroxide. Accordingly, the organic solvent is first removed from the liquid recovered by vacuum distillation or heat distillation, or by standing to the extent possible by the means employed, and the peroxide and the peroxide decomposition product which has precipitated is removed from the liquid recovered to the maximum extent by methanol, water, or the like to thereby obtain the recovered rubber of this invention in the form of a viscous liquid.

The thus recovered rubber of this invention is preferably heat treated for the purpose of promoting the polymerization and increasing the molecular weight.

The heat treatment is conducted at a temperature of 100° C. to 160° C., and preferably 120° C. to 140° C. for 5 minutes to 30 minutes, and preferably for 10 minutes to 20 minutes. The heat treatment within such range enables an appropriate increase in the molecular weight and the rubber is imparted with elasticity.

The rubber recovered by decomposing the rubber composition and optionally heat treating the decomposition product is a liquid rubber-which has a weight average molecular weight of 5000 to 30000. The recovered rubber of this invention may also contain a minute amount of peroxide which was used in the decomposition of the starting rubber composition, the decomposition product of the peroxide, and the vulcanizer such as sulfur. Typical decomposition product of the peroxide is a hydroxide of the peroxide.

The content of the peroxide decomposition product in the recovered rubber is preferably 5% by weight or less, and more preferably, 2% by weight or less.

The recovered rubber of this invention can be readily converted into a pure recovered rubber having a weight average molecular weight of 10000 or higher by treating the rubber with methanol, water or the like and recovering the undissolved content.

The recovered rubber of this invention has a relatively high molecular weight, and the recovered rubber is well adapted for reuses in the production of a rubber composition as the raw material.

The recovered rubber of this invention has unique properties compared to conventional rubbers, conventional liquid polymers, and conventional aromatic oils. For example, the rubber composition produced by employing the recovered rubber of this invention exhibits higher hysteresis as well as higher loss tangent (tan δ) compared to the rubber composition prepared by incorporating the conventional starting rubber (basic formulation).

As an exemplary case, when the hysteresis of the rubber composition having the basic formulation produced by incorporating a conventional rubber as the rubber component without using any liquid polymer or aromatic oil is 100, the hysteresis can be increased to 200 or higher by incorporating 10 parts by weight of the non-heat treated recovered rubber in the total rubber component, and 400 or higher by incorporating 20 parts by weight of the non-heat treated recovered rubber in the total rubber component. When the recovered rubber used is the one which has been heat treated, the hysteresis can be increased to 280 or higher by incorporating 10 parts by weight of the recovered rubber.

The situation is similar for the loss tangent (tan δ). When the rubber composition having the basic formulation has a tan δ of 100, the tan δ can be increased to 180 or higher by incorporating 10 parts by weight of the non-heat treated recovered rubber in the total rubber component, and 270 or higher by incorporating 20 parts by weight of the non-heat treated recovered rubber in the total rubber component. When the recovered rubber used is the one which has been heat treated, the tan δ can be increased to 180 or higher by incorporating 10 parts by weight of the recovered rubber.

The reason for the unique features of the recovered rubber of this invention is not fully clear at the present moment. The inventors of the present invention, however, believe that the presence of minute amount of impurities including the peroxide and its decomposition product, the vulcanizer, and the like as well as the polar group which has been incorporated in the recovered rubber should be responsible for such unique features.

Owing to the unique features of the recovered rubber of this invention as described above, the rubber composition of this invention as described below produced by incorporating the recovered rubber of this invention is quite suitable for use, for example, in a seismic energy absorbing member, namely, in various seismic isolation, vibration control, and seismic resistant structures. The rubber composition having such features does not suffer from decrease in the loss tangent (tan δ) at high temperatures, and such rubber composition is highly adapted for use in racing tires.

Next, the rubber composition of this invention is described.

The rubber composition of this invention is a rubber composition produced by using the recovered rubber of this invention for the starting rubber.

The rubber used in the formation of the rubber composition of this invention is the recovered rubber of this invention. In this invention, the recovered rubber of this invention is blended preferably at an amount of 1 parts by weight to 20 parts by weight, and more preferably 5 parts by weight to 20 parts by weight per 100 parts by weight of the total rubber component. The amount blended is preferably 1 parts by weight to 20 parts by weight, and more preferably 5 parts by weight to 20 parts by weight. The amount blended is preferably up to 50 parts in order prevent marked decrease in the tear properties of the rubber composition.

In this invention, it is also possible to use the rubber of this invention in combination with other rubbers to thereby increase the hysteresis of the rubber composition.

Exemplary such other rubbers include conventional rubbers such as natural rubber (NR), isoprene rubber (IR), styrene-butadiene rubber (SBR), butadiene rubber (BR), butyl rubber (IIR), and chloroprene rubber (CR), and blend of such rubbers.

The rubber composition of this invention also contains a conventional vulcanizer as described above. Exemplary vulcanizers include sulfur; non-elemental sulfur vulcanizer such as tetramethyl, thiuram disulfide, tetraethylthiuram disulfide; bismorpholine disulfide, dipentamethylenethiuram disulfide, organic peroxide, quinone dioxime, phenolformaldehyde resin, a mixture of nitroso compound and diisocyanate, zinc oxide, magnesium oxide, zinc peroxide, triethylenetetramine, methylene dianiline, diphenylguanidine, hexamethylenediamine carbamate, ethylenediamine carbamate, and bis-p-aminocyclohexylmethane carbamate.

The rubber composition of this invention may also contains a conventional filler. Exemplary such fillers are carbon black, silica, zinc oxide, and calcium carbonate, and the preferred are carbon black and silica.

Amount of the filler blended is preferably 1 parts by weight or more, and more preferably, 10 parts by weight to 130 parts by weight per 100 parts by weight of the rubber component.

In addition to the starting rubber, the filler such as carbon black, and other components as described above, the rubber composition of this invention may contain a wide variety of other conventional resins, elastomers, other compounding ingredients, and rubber subsidiary materials such as vulcanization (curing) accelerator, vulcanization aid, activating agent, vulcanization retarder, softener, plasticizing agent, adhesive, tackifier, vulcanizer, foaming agent, foaming aid, reinforcing agent, antiaging agent, colorant, pigment, flame retardant, and mold release agent, which may be incorporated in the kneading, in the vulcanization, with the addition the filler, or any other step in the production.

The method for producing the rubber composition of this invention is not particularly limited. For example, the rubber composition is produced by adopting the method wherein the raw material for the rubber, the recovered carbon black, and other optional additives are kneaded with the temperature elevated to about 50° C. to 180° C. using a twin-screw extruder, Banbury mixer, kneader, or the like.

<Recovered Carbon Black>

The fourth aspect of the present invention is directed to a recovered carbon black recovered by decomposing the rubber composition containing at least carbon black and the rubber.

The rubber composition which is used for the starting material in producing the recovered carbon black of this invention may be any carbon black-containing rubber composition which is the same as the one explained in the foregoing under the heading of the <Recovered rubber>.

In this invention, the recovered carbon black of this invention is obtained either by decomposing the rubber composition and thereafter recovering the carbon black, or by decomposing the rubber composition and recovering the carbon black at once.

The method of decomposition employed for obtaining the recovered carbon black of this invention is not particularly limited as long as substantial separation of the rubber component and the carbon black in the rubber composition is accomplished, and the recovered carbon black of this invention is obtained. In the typical method employed, the rubber composition is immersed with or without agitation in an organic solvent containing a peroxide at a content of 0.01% by weight to 50% by weight at a ratio of the rubber composition (mg)/the organic solvent (ml) of up to 30. This method has been described in detail in the preceding part, and the description is not repeated.

In this invention, the rubber composition is decomposed by an appropriate decomposition method, and when the rubber composition contains a structural member of steel, resin or the like, the structural member is removed from the resulting solution to recover the solid product of the rubber composition. The separation of the solid product of the decomposed rubber composition may be accomplished by any of conventional means including centrifugation, membrane separation, and filtration.

In this invention, the recovered rubber composition of this invention is obtained from such solid product. By fully washing the recovered solid product with toluene or the like, and drying the product by air drying, vacuum drying or the like, the liquid content will be substantially removed to leave the recovered carbon black of this invention.

The unique feature of the recovered carbon black of this invention is not fully understood at this moment. Use of this recovered carbon black, however, enables production of a rubber composition having improved damping properties as will be described below. This composition exhibits unique damping properties when compared with the rubber composition having a conventional virgin carbon black blended therewith, and this indicates the unique feature of the recovered carbon black of this invention. Although the mechanism is yet to be confirmed, the inventors of the present invention believe that such unique feature is ascribable to the attachment of organic and inorganic components on the surface of the carbon black in some adequate manner.

The rubber composition of this invention is not particularly limited except for the inclusion of the recovered carbon black of this invention as describe above for the filler. The components other than the recovered carbon black may be, similar to those described for the rubber composition containing the recovered rubber, and such components may be used in equivalent amount. The production method is also similar to the one described for the rubber composition containing the recovered rubber.

Amount of the recovered carbon black blended is preferably 1 parts by weight or more, and more preferably, 10 parts by weight to 130 parts by weight per 100 parts by weight of the rubber component.

In this invention, the recovered carbon black of this invention may be used in combination with other fillers in order to improve the breakage properties of the rubber composition with the excellent damping properties retained. Exemplary fillers combined are conventional fillers such as conventional known carbon black and silica.

<Production Method of Treated Carbon Black>

Fifth aspect of the present invention is directed to a method of treated carbon black production.

This method of treated carbon black production comprises the step of heat treating the starting carbon black in the presence of a rubber compound component.

The starting virgin carbon black is not limited to any particular type, and the carbon black of any type which has been produced by any conventional method can be used for the starting carbon black including those produced by oil furnace or gas furnace method, for example, furnace black and channel black. The carbon black is also not limited to any particular species, and exemplary species are N339 and N220 which are universal carbon black (commercially available product).

Then, the treated carbon black may be produced by conducting the heat-treatment step as described from now on after the step of producing a starting virgin carbon black by oil furnace method or other conventional virgin carbon black production process.

With regard to the rubber compound component, at least a rubber or a vulcanization aid is used as the rubber compound component.

The rubber compound component may comprise any of the rubbers or the vulcanization aids which are generally known as the components of the rubber compound. Exemplary rubbers which are adapted for use include natural rubber (NR), isoprene rubber (IR), styrene-butadiene rubber (SBR), butadiene rubber (BR), chloroprene rubber (CR) and other diene rubbers and butyl rubber (IIR), which may be used in combination of two or more.

The rubber is generally used at an amount of 10 to 400 parts by weight, and preferably, at an amount of 20 to 200 parts, by weight per 100 parts by weight of a starting virgin carbon black.

Exemplary vulcanization aids include zinc oxide, magnesium oxide, stearic acid, and oleic acid, which may be used in combination of two or more.

The vulcanization aid is generally used at an amount of 0.5 to 40 parts by weight, and preferably, at an amount of 2 to 20 parts by weight per 100 parts by weight of a starting virgin carbon black.

Preferably, the rubber compound component comprises at least the rubber, and more preferably, both the rubber and the vulcanization aid.

The rubber compound component may further comprise a vulcanizer. The rubber compound component comprising the vulcanizer may be the one containing either one of the rubber and the vulcanization aid, or the one containing both the rubber and the vulcanization aid.

The vulcanizers may be at least one member selected from sulfur, organic peroxide, and a vulcanization accelerator.

The organic peroxide may be any of the conventional organic peroxide as described above. Among these, the preferred is benzoyl peroxide.

The organic peroxide can be used as a solution in the organic solvent as described below, for example, in toluene generally at a concentration of 0.01% by weight to 50% by weight.

Typical vulcanization accelerators include non-elemental sulfur vulcanizers such as tetramethylthiuram disulfide and tetraethylthiuram disulfide; bismorpholine disulfide, dipentamethylenethiuram disulfide, quinone dioxime, phenol-formaldehyde resin, a mixture of nitroso compound and diisocyanate, magnesium oxide, zinc peroxide, triethylenetetramine, methylene dianiline, diphenylguanidine, hexamethylenediamine carbamate, ethylenediamine carbamate, and bis-p-aminocyclohexylmethanecarbamate.

The vulcanizer can be generally used at an amount of 1 to 300 parts by weight, and preferably, at an amount of 3 to 200 parts by weight per 100 parts by weight of the starting carbon black.

Typical rubber compound components which may be used for treating the starting carbon black are:

(i) a vulcanization aid; or a vulcanization aid admixed with a vulcanizer;

(ii) a rubber; a rubber used in combination with a vulcanization aid; a rubber admixed with a vulcanization aid and a vulcanizer. When the vulcanizer comprises sulfur, a vulcanization accelerator, and an organic peroxide, and in particular, benzoyl peroxide, a strong effect (effect of reducing tan $\delta$ at 60° C.) is achieved.

In addition, the rubber compound component may further comprise components such as an antiaging agent to the extent that does not adversely affect the objects of this invention.

When a starting virgin carbon black is heat treated in the presence of the rubber compound component as described above, it is preferable to facilitate a sufficient contact between these components by preliminarily mixing these components in an organic solvent to prepare a mixed solution.

The organic solvent used may be any solvent which is liquid at normal pressure and normal temperature, for example, a hydrocarbon or an alcohol. The hydrocarbon may be either saturated or unsaturated, and the hydrocarbon is not limited to any of aromatic, aliphatic, or alicyclic hydrocarbons. Exemplary hydrocarbons are benzene, toluene, xylene, hexane, decalin (decahydronaphthalene), methanol, ethanol, tetralin (tetrahydronaphthalene), and cyclohexane which may be used as a mixture. The most preferred are toluene, benzene, and xylene.

Next, the organic solvent is removed from the mixed solution of the starting virgin carbon black and the rubber compound component, and the resulting dried product is subjected to the heat treatment. The drying of the mixed solution is typically conducted by vacuum distillation at a temperature of up to 40° C.

The starting virgin carbon black is heat treated in the presence of the rubber compound component at a temperature of 300° C. to 1500° C. for at least 30 seconds, and preferably, at a temperature of 400° C. to 800° C. for 5 minutes to 120 minutes. The temperature and the time of the heat treatment may be adequately determined, for example, by reducing the time at a higher temperature, and increasing the time at a lower temperature.

The heat treatment is conducted in a non-oxidizing atmosphere by using: an inert gas such as nitrogen gas, argon gas, or helium gas.

The heat treatment may be accomplished in an apparatus such as heat resistance quartz tube furnace.

This invention also provides the treated carbon black (product) produced by the carbon black production method as describe above. When this carbon black is incorporated in the vulcanized rubber composition, tan $\delta$ at 60° C. is greatly reduced compared to the rubber having the starting virgin carbon black of equivalent content blended therein.

To be more specific, when the treated carbon black produced as described above is blended in a natural rubber-based composition, the value of the tan $\delta$ at 60° C. of the vulcanized rubber can be reduced at least by 7% compared to the rubber having the starting carbon black of equivalent content blended therein (hereinafter also referred to as the standard rubber composition).

Furthermore, when the rubber is used for the rubber compound component to be co-present in the heat treatment, the value of the tan $\delta$ of the resulted composition including the treated carbon black at 60° C. can be reduced by 20% or more compared to the standard rubber-composition, and when the rubber and the vulcanization aid is used, the value of the tan $\delta$ of the composition at 60° C. can be reduced by approximately 30%. The most preferred is the use of the rubber and the vulcanization aid in further combination with the vulcanizer containing an organic peroxide, and in this case, the tan $\delta$ of the resulted composition at 60° C. can be reduced by substantially 40%. The formulation of this preferable embodiment corresponds to the ordinary rubber composition.

Such effect of reducing the tan $\delta$ of a rubber composition at 60° C. attained by the heat treatment of the carbon black with the rubber compound component in a non-oxidizing atmosphere is by no means expectable from the prior art.

It should also be noted that the treated carbon black (product) of this invention as described above achieves sufficient effect when it is used for the purpose of reinforcement as in the case of the conventional carbon black, and in addition, incorporation of such treated carbon black does not adversely affect the rubber properties of the rubber composition.

Accordingly, this invention also provides a rubber composition containing such treated carbon black, and also, a vulcanized rubber product produced from such rubber composition.

The rubber composition of the invention contains the treated carbon black of this invention generally at an amount of at least 1 parts by weight, and preferably at an amount of 10 parts by weight to 130 parts by weight per 100 parts by weight of the rubber component.

The rubber composition and the vulcanized rubber product of this invention are produced by the same process as the conventional rubber composition and the conventional vulcanized rubber except for the use of the treated carbon black as described above. In such as case, the carbon black of this invention can be either used alone or in combination with other commercially available carbon black of appropriate amount. For example, the carbon black of this invention can be used in combination with a known carbon black of high abrasion resistance for the purpose of improving the abrasion properties.

The rubber used in the production of the rubber composition of this invention is not particularly limited, and exemplary rubbers are those described as the component of the rubber compound used in the production of the carbon black. The rubber composition of this invention may also contain various components which are generally incorporated in the rubber as described above, for example, the components known in the art such as vulcanization (accelerating) aid vulcanizer, vulcanization (curing) accelerator, azobisisobutyronitrile or other radical generator, activating agent, vulcanization retarder, softener, plasticizing agent, adhesive, tackifier, vulcanizer, foaming agent, foaming aid, reinforcing agent, antiaging agent, colorant, pigment, flame retardant, mold release agent; and other components known in the art such as resin, elastomer, other compounding ingredients, rubber subsidiary material, inorganic filler such as silica, steel member such as brass-plated steel cord, resin member such as organic fiber as in the case of polyester carcass cord. The compositional ratio of the rubber composition may be adequately determined depending on the situation.

In addition, the components as described above are not limited to the timing of their addition whether they have been added in the kneading, vulcanization, or with the addition of the reinforcement or the filler.

The vulcanized rubber of this invention is the product produced by vulcanizing the rubber composition as described above, and the vulcanization may be conducted by the method normally employed in the art. It should be noted that the vulcanized rubber include those which have been partly vulcanized and those which are vulcanized to an insufficient degree.

The rubber composition as described above may be kneaded by any conventional method which is not particularly limited. For example, the rubber composition may be produced by adopting the method wherein the rubber components, the carbon black, and other optional components are kneaded with the temperature elevated to about 50° C. to 180° C. using a twin-screw extruder, Banbury mixer, kneader, or the like.

The vulcanized rubber product of this invention is useful for use in automobile tire, cable, sheet, packing, scrap rubber in the molding, hose, belt, and other rubber products, and it is particularly useful for use in tires owing to the advantageous property of low rolling resistance. In the use for such application, the vulcanized rubber of this invention may be used in as a composite with other structural member.

As described above, this invention has enabled to provide a vulcanized rubber product which has high tensile stress (modulus) and excellent abrasion properties, and at the same time, low tan δ (loss tangent) at 60° C.

<Heat Treatment of Recovered Carbon Black>

Sixth aspect of the present invention is directed to a heat treated recovered carbon black obtained by using the recovered carbon black (recovered solid product) produced in the fourth aspect of the present invention for the starting carbon black in the firth aspect of the present invention, and a rubber composition containing such recovered carbon black.

To be more specific, the heat treated recovered carbon black of this invention is the carbon black produced by heat treating the solid product recovered from the rubber composition containing at least the rubber and the carbon black in a non-oxidizing atmosphere at a temperature of 400° C. to 1000° C. for 5 minutes to 60 minutes so that the amount of the organic component on the surface is equivalent or smaller than the amount of the organic components on the surface of the starting virgin carbon black of a rubber composition.

In the present invention, a carbon black to be heat treated may be the solid product obtained from the rubber composition containing carbon black by liquidification decomposition and it also may be an untreated rubber composition. The solid product may also contain a liquid such as water and solvent.

The decomposition (liquidification method) of the rubber composition is as described above in the preceding part, and the description is not repeated.

In this invention, the rubber composition is decomposed by an appropriate decomposition method, and when the rubber composition contains a structural member of steel, resin or the like, the structural member is removed from the resulting solution to recover the solid product of the rubber composition. The separation of the solid product of the decomposed rubber composition may be accomplished by any conventional means including centrifugation, membrane separation, and filtration. By fully washing the recovered solid product with toluene or the like, and if necessary, drying the product by air drying at room temperature, vacuum drying or the like, the liquid content will be removed. It is preferable that the product is subjected to the heat treatment after such procedure.

An untreated rubber composition used as the starting material of the liquidified decomposition of the present invention may be subjected to the heat treatment as described above with no preliminary treatment. In such case, the rubber composition is preferably cut into sections with an average particle size of up to 1.8 mm, and more preferably, to an average particle size of 0.3 mm to 0.8 mm. In addition, it is preferable to reduce the amount of the rubber composition subjected to the heat treatment, and when the heat treatment is conducted by using a heat resistant tube, the amount of the rubber composition treated per 1 $cm^3$ of the tube volume is preferably in the range of 7 mg to 13 mg.

The recovered solid product as described above is heated in a non-oxidizing atmosphere such as nitrogen atmosphere at a temperature of 300° C. to 1500° C. for at least 30 seconds. When the temperature is within such range, the rubber component will be fully decomposed and removed, and the carbon black to be recovered will not be recovered in the form of graphite.

The heat treatment is generally conducted by using a heat resistant tube, and the amount of the recovered solid product subjected to the heat treatment is preferably in the range of 7 mg to 15 mg per 1 $cm^3$ of the heat resistant tube volume. Exemplary heat resistant tubes include tubes made of quarts glass and tubes made of a metal such as stainless steel.

In this invention, the heat treatment is conducted for at least 30 seconds. However, the heat treatment is preferably conducted for 5 minutes to 120 minutes, and when the solid product heat treated is obtained from the liquidified decomposition of the rubber composition in the present invention, the heat treatment is preferably conducted for 7 minutes to 60 minutes. When an untreated rubber composition itself is heat treated, the heat treatment is preferably conducted for 15 minutes to 60 minutes.

Within such range, the amount of the organic component on the surface of the carbon black will be within the predetermined range as will be described below, and then, the physical properties of the recovered carbon black will be equivalent or better than the physical properties of a virgin carbon black used as the starting material.

In this invention, the heat treated recovered carbon black is sufficiently heat treated, the amount of the rubber components and other organic components on the surface is equivalent or less than the amount of the organic component on the surface of a virgin carbon black.

The amount of the rubber components and other organic components on the surface of the heat treated recovered carbon black is determined by weight alteration in thermogravimetric analysis (TGA) in a non-oxidizing atmosphere at 20° C. to 700° C. It can be said that the amount of the organic components on the surface is equivalent with the amount of the organic component on the surface of a virgin carbon black used as the starting material when the weight loss of the sample at 20° C. to 700° C. is in the range of 1.5% to 2.5% provided that the weight of the sample at 20° C. is 100%.

The heat treated recovered carbon black of this invention exhibits weight loss at 20° C. to 700° C. of up to 2.5%, and preferably, in the range of 1% to 2%.

The heat treated recovered carbon black of this invention is fully reusable, and use of this recovered carbon black enables production of a rubber composition having a tensile stress and a loss tangent equivalent with those of the rubber composition having conventional carbon black blended therein, or a rubber composition having a higher tensile stress and a lower loss tangent compared to the rubber composition having conventional virgin carbon black blended therein. The reason for this is yet unknown at the present moment. The inventors of the present invention, however, postulate that this should be ascribable to the absence of the organic components on the surface of the carbon black, and if not absent, scarcity of the organic components attached to the surface of the carbon black.

The rubber composition of this invention contains the heat treated carbon black of this invention as the filler. This rubber composition is not limited except for its inclusion of the recovered carbon black which has been heat treated, and this rubber composition may contain the same components as the components of the rubber composition containing the (non-heat treated, equivalent) recovered carbon black as described above. Also, this rubber composition can be produced by the same method.

In this invention, it is possible to use either the heat treated recovered carbon black which has been obtained by heat treating the solid product recovered in the decomposition of the rubber composition; or the heat treated carbon black which has been obtained by heat treating tan untreated rubber composition itself; or both of such heat treated carbon blacks.

In this invention, the heat treated recovered carbon black is preferably blended at an amount of at least 1 parts by weight, and more preferably, at an amount of 10 parts by weight to 130 parts by weight per 100 parts by weight of the rubber component.

When a rubber composition having a high tensile stress (modulus) and low loss tangent (tan δ) is to be obtained in this invention, it is preferable to use the heat treated recovered carbon black of this invention as the only filler. However, a filler such as silica which is known in the art and used for the starting material may be used at an amount which does not adversely affect the object of this invention.

When a rubber composition having improved abrasion properties is to be obtained in this invention, the heat treated recovered carbon black of this invention may be used in combination with another filler, for example, a highly abrasion resistant virgin carbon black which is known in the art and used for the starting material. A rubber composition having high tensile stress (modulus), low loss tangent (tan δ), and improved abrasion properties is thereby obtained.

Examples of such additional fillers are conventional fillers such as conventional carbon black and silica which are well known in the art.

EXAMPLES

Next, the present invention is described in further detail by referring to Examples which by no means limit the scope of the present invention.

In the Examples and Comparative Examples as described below, rubber compositions of the formulation as shown in Table 1 were used for the production of the vulcanized rubbers and the unvulcanized rubbers for use in the dissolution test and evaluation of the carbon black.

The vulcanized rubber was produced by kneading the components shown in Table 1, and heating the mixture at 148° C. for 10 minutes.

TABLE 1

| Rubber composition | (parts by weight) |
| --- | --- |
| NR(natural rubber) | 100 |
| Carbon black | 50 |
| Zinc oxide | 5 |
| Stearic acid | 3 |
| Antiaging agent | 1 |
| Vulcanization accelerator | 1.2 |
| Sulfur | 1.8 |

In the table, the antiaging agent (unless otherwise noted) is N-phenyl-N'-(1,3-dimethylbutyl)-p-phenylenediamine and the vulcanization accelerator is N-t-butyl-2-benzothiazyl-sulfenamide.

The vulcanized rubber produced in the Examples and the Comparative Examples were evaluated as described below.

<Hysteresis Curve>

A rectangular,test strip of the rubber composition having a width of 10 mm, a length of 150 mm, and a thickness of 1 mm was cut out. The test strip was stretched 5 times to 100% elongation and the tensile stress was measured in accordance with the procedure described in JIS K6254.

<Stress-strain (S-S) Properties>

A dumbbell-shaped test strip (JIS No.3) having a thickness of 1 mm was cut out. The test strip was evaluated for 300% modulus ($M_{300}$) [MPa], strength at break ($T_B$) [MPa], elongation at break ($E_B$) [%], and energy corresponding to the area determined from the S-S curve (ENG) [MPa] in accordance with the procedure described in JIS K 6251.

<Measurement of Loss Tangent (tan δ)>

A rectangular test strip of the rubber composition having a width of 5 mm, a length of 100 mm, and a thickness of 1 mm was cut out. The test strip was evaluated for loss tangent (tan δ) at 0° C., 20° C., and 60° C. in accordance with the procedure described in JIS K 6394 (initial strain, 10%; amplitude, ±2%; frequency, 20 Hz).

Example 1-1

Vulcanized rubber obtained from the rubber composition as shown in Table 1 was evaluate by dissolution test.

A rubber composition produced by blending and kneading 100 parts by weight of the rubber (NR), 50 parts by weight of carbon black (HAF-HS), 5 parts by weight ZnO, 3 parts by weight of stearic acid, 1 part by weight of the antiaging agent (S13), 1.2 parts by weight of the vulcanization accelerator (NS), and 1.8 parts by weight of sulfur was vulcanized by heating to 148° C. for 10 minutes. 25 mg of the resulting vulcanized rubber composition was cut out (10×2×1 mm) for use as a test piece.

<Separation of Vulcanized Rubber>

The test piece was immersed in 5 ml of the organic solvent containing benzoyl peroxide (hereinafter abbreviated as BPO) at the concentration shown in Table 1a (vulcanized rubber composition (mg)/organic solvent (ml)=5), and the test piece was left immersed at room temperature (25° C.). The composition dissolved and a non-viscous liquidified product (suspension) was obtained.

Centrifugation of this suspension resulted in the separation of the suspension into transparent solution phase and carbon black precipitate.

Figure 2:
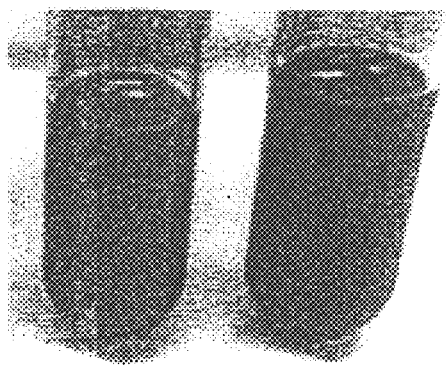
FIG. 2 is a schematic view showing the state of the liquidified product (suspension) after the agitation (A) and after the separation (B) in Example 1-1.
Figure 2:
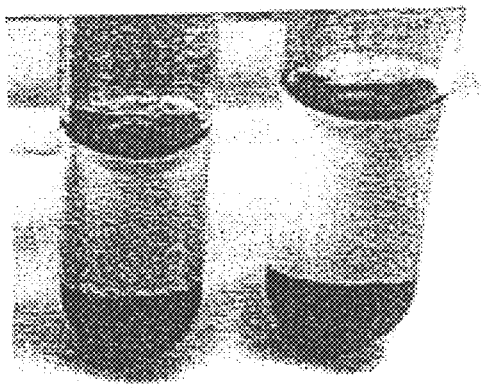

FIG. 2 schematically shows the photographs of the suspension after the agitation and the solution after the separation. (A) is the suspension after the agitation, and (B) is the solution after the separation. The organic solvent used is toluene in both cases, and the BPO concentration is 0.5% (test tube on the left) and 1.0% (test tube on the right).

The time that was required for the liquidification in the use of different solvents is shown in Table 1a.

TABLE 1a

| Organic | Time required for liquidification | | |
|---|---|---|---|
| solvent | BPO 1.0% | BPO 0.5% | BPO 0.1% |
| Toluene | 2 days | 3 days | 4 days |
| Benzene | 3 days | 3 days | 4 days |
| Xylene | 3 days | 3 days | 4 days |
| Decalin | 6 days | 6 days* | 7 days* |
| Hexane | 7 days* | 7 days* | 9 days* |
| Methanol | 7 days* | 7 days* | 10 days* |
| Ethanol | 7 days* | 7 days* | 10 days* |
| Water | undissolved | undissolved | undissolved |

*a minute amount of undissolved portion was found

Comparative Example 1-1

The procedure of Example 1-1 was repeated except that the vulcanized rubber composition was immersed in a solvent containing no BPO. The vulcanized rubber composition exhibited neither swelling nor other changes, and did not become liquidified.

Comparative Example 1-2

The procedure of Example 1-1 was repeated except that 600 mg of the vulcanized rubber composition was immersed in 5% toluene containing the BPO at a concentration of 1%. The vulcanized rubber composition did not completely dissolve after 3 days at room temperature, and the centrifugation of the suspension did not result in the separation into the transparent solution phase and the carbon black precipitate.

Example 1-2

The procedure of the Example 1-1 was repeated except that 25 mg of the vulcanized rubber composition which had been sheared until the rubber composition was in the form of pulverized rubber having an edge of 1 mm or less was immersed in 5 ml of toluene containing the BPO at a concentration of 1% for 3 days at room temperature. Although the vulcanized rubber composition became substantially liquidified, the rubber composition remained partly undissolved. Centrifugation of the suspension, however, resulted in the separation into the transparent solution phase and the carbon black precipitate.

Example 1-3

Vulcanized rubber compositions containing different amount of carbon black were evaluated for their liquidification by repeating the procedure of Example 1-1 using toluene containing the BPO at a concentration of 1%.

Amount of the carbon black blended per 100 parts by weight of the rubber (NR) and the time required for liquidification are shown below.

| [Amount of carbon black blended] | [Time required for liquidification] |
|---|---|
| 50 parts by weight | 40 hours (Ex.1) |
| 30 parts by weight | 50 hours |
| 10 parts by weight | 70 hours |
| 0 part by weight (not blehded) | 28 days |

The results as described above confirmed that stronger liquidification effect is found with the increase in the amount of carbon black blended.

Example 1-4

The procedure of Example 1-1 was repeated by using 50% solution of diisopropylbenzene hydroperoxide (product name, Percumyl P, manufactured by Nippon Oil & Fats Co. Ltd.) in an aromatic hydrocarbon instead of the BPO, and diluting the solution with toluene to a final concentration of 1%. The vulcanized rubber composition was immersed in the solution, and the rubber became liquidified after 5 days.

Example 1-5

Rubber materials of the belt and the carcass constituting the tire were cut into pieces of about 10×3×2 mm. The pieces were immersed in toluene containing BPO at a concentration of 1% for 10 days, and the compound covering the steel cord and the fiber cord was pushed weakly. The compound became crumbled and the steel cord and the carcass cord (PET) were readily separated as shown in FIGS. 3 and 4, respectively.

FIGS. 3 and 4 schematically show the expanded photographic views of the separated steel cord and carcass cord.

These views indicate that the cords were perfectly separated with no deformation in their shape.

Example 1-6

The vulcanized rubber composition used in Example 1-1 was immersed in 5 ml of toluene solution of BPO at a concentration of 1%, and left at the temperature shown in Table 1b.

The time required for the liquidification of the vulcanized rubber composition at respective temperature is shown in Table 1b.

TABLE 1b

| | Temperature of the solution | | | | |
|---|---|---|---|---|---|
| Time | 0° C. 8 days | 25° C. 2 days | 40° C. 1 day | 70° C. ∞ | 100° C. ∞ |
| Note | Delay in the activation of BPO resulted in slower liquidification | BPO was adequately activated with reduced inactivation, and liquidification was appropriately promoted. | | Inactivation of BPO resulted in undissolved portion. | Rapid inactivation of BPO resulted in considerable proportion of undissolved portion. |

When the temperature of the solution was 70° C. and 100° C., proportion of the undissolved portion, namely, the undissolved portion/sample (mg) was 0.3 and 0.6, respectively. The suspension could be separated into the transparent solution phase and the carbon black precipitate by the centrifugation.

As shown in Table 1b, the vulcanized rubber composition is adequately liquidified when the solution is at the temperature of 0 to 40° C.

Example 2

<Production of Unvulcanized Rubber>

Unvulcanized rubber obtained from the rubber composition as shown in Table 1 was evaluate by dissolution test.

A rubber composition produced by blending and kneading the same components as Example 1, namely, 100 parts by weight of the rubber (NR), 50 parts by weight of carbon black (HAF-HS), 5 parts by weight ZnO, 3 parts by weight of stearic acid, 1 part by weight of the antiaging agent (S13), 1.2 parts by weight of the vulcanization accelerator (NS), and 1.8 parts by weight of sulfur was kneaded at 80° C. for 5 minutes, and the mixture was rolled into sheet form. The resulting unvulcanized rubber composition was cut into blocks of (3 mm×3 mm×2.5 mm) for use as test piece A.

<Separation of Unvulcanized Rubber>

The test piece A was immersed in 5 ml of the organic solvent containing benzoyl peroxide (hereinafter abbreviated as BPO) at the concentration shown in Table 4 (test piece A(mg),/organic solvent (ml)=5), and the test piece was left immersed at room temperature (25° C.). The composition dissolved and a non-viscous liquidified product (suspension) was obtained. Centrifugation of this suspension resulted in separation of the suspension into transparent solution phase and carbon black precipitate.

The time that was required for the liquidification in the use of different solvents is shown in Table 2.

TABLE 2

| Organic solvent | Time required for liquidification | | |
|---|---|---|---|
| | BPO 1.0% | BPO 0.5% | BPO 0.1% |
| Toluene | 3 days | 4 days | 5 days |
| Benzene | 4 days | 4 days | 5 days |
| Xylene | 4 days | 4 days | 5 days |
| Decalin | 7 days | 7 days | 8 days |
| Hexane | 8 days | 8 days | 10 days |
| Methanol | 8 days | 8 days | 11 days |
| Ethanol | 8 days | 8 days | 11 days |
| Water | undissolved | undissolved | undissolved |

Comparative Example 2

The procedure of Example 1 was repeated except that the test piece A was immersed in a solvent containing no BPO. Carbon gel was still present after 90 days, and the test piece A could not be completely liquidified.

Example 2 and Comparative Example 2 demonstrate that the unvulcanized rubber composition can be liquidified by using an organic solvent containing at least 0.1% by weight of the peroxide such as BPO for the treating solution. In addition, it has been demonstrated that the unvulcanized rubber composition is liquidified in shorter time when the BPO content is 1.0% by weight compared to the case of 0.1% by weight. With regard to the type of the organic solvent, insolubilization of the unvulcanized rubber composition is completed in shorter time in the use of toluene, benzene, and xylene compared to the use of other organic solvent.

Example 3

Rubber compositions containing the recovered rubber was produced as described below.

<Production of Recovered Rubber 1>

<Separation of Vulcanized Rubber>

First, the components shown in Table 1 were blended, kneaded, and heated to 148° C. for 10 minutes to produce the vulcanized rubber composition. The carbon black used was N339.

Next, 70 g of the rubber composition was immersed in 7 liters of toluene solution containing benzoyl peroxide (hereinafter abbreviated as BPO) at a concentration of 1% by weight, and the solution was agitated. The composition dissolved and a non-viscous liquidified product (suspension) was obtained.

Centrifugation of this suspension resulted in the separation of the suspension into transparent solution phase and solid product.

<Recovered Rubber 1>

The transparent solution phase was allowed to stand for evaporation of toluene, and BPO and benzoic acid precipitated were removed by filtration and washing with water to obtain recovered rubber 1.

The recovered rubber 1 was a viscous liquid, and it had a weight average molecular weight of about 10000. When the recovered rubber 1 was measured for its infrared absorption spectrum, a peak belonging to polyisoprene (including a polar group) and a peak belonging to benzoic acid were measured. These peaks indicate that the recovered rubber 1 is a liquid rubber having polyisoprene skeleton and containing 2% by weight of benzoic acid produced by decomposition of the BPO.

<Production of Recovered Rubber 2>

The recovered rubber 1 was heat-treated at 140° C. for 10 minutes, and the resulting rubber was designated recovered rubber 2. The recovered rubber 2 was a viscous liquid as in the case of the recovered rubber 1 although it was more elastic, and it had a weight average molecular weight of about 15000. Evaluation of infrared absorption spectrum revealed that the recovered rubber 2 is a liquid rubber having polyisoprene skeleton and containing 1% by weight of benzoic acid.

<Production of Rubber Composition>

In Examples 3-1 to 3-4, the rubber compositions produced by blending and kneading the components shown in Table 3 were heated to 148° C. for 10 minutes for vulcanization. The antiaging agent and the vulcanization accelerator were the same as those used for the rubber compositions as described above.

Comparative Examples 3-1 to 3-3

The rubber compositions shown in Table 3 were produced by repeating the procedure of Example 3 except that the compositions contained no recovered rubber.

In Table 3, LIR-50 (weight average molecular weight 63000, manufactured by Kuraray Co., Ltd.) was used for the liquid polymer, and Dianaprocess AH-24 manufactured by Idemitsu Kosan Co., Ltd. was used for the aromatic oil.

The results of the evaluation for the rubber compositions produced as described above are shown in Table 3.

Figure 5:
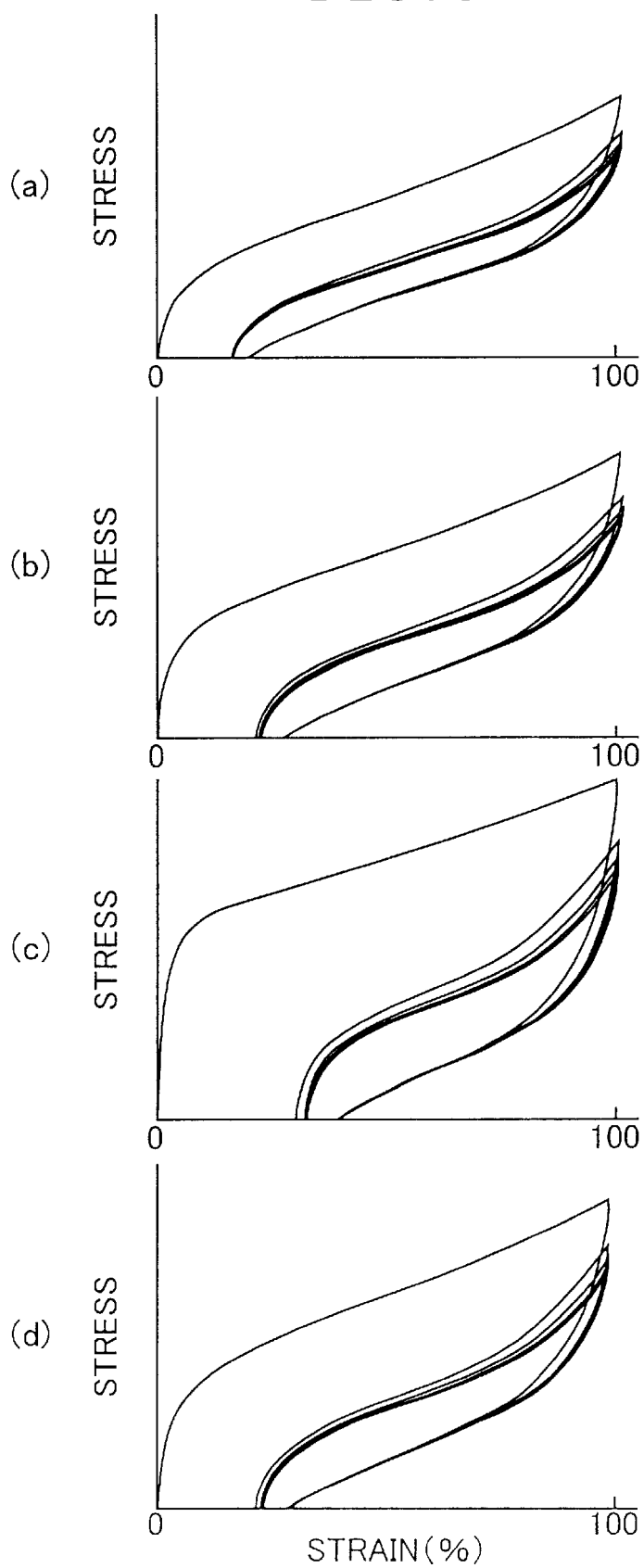
FIG. 5 is a view showing hysteresis curves of the rubber compositions of Example 3. (a), (b), (c) and (d) are graphs showing hysteresis curves of Example 3-1, Example 3-2, Example 3-3, and Example 3-4, respectively.
Figure 6:
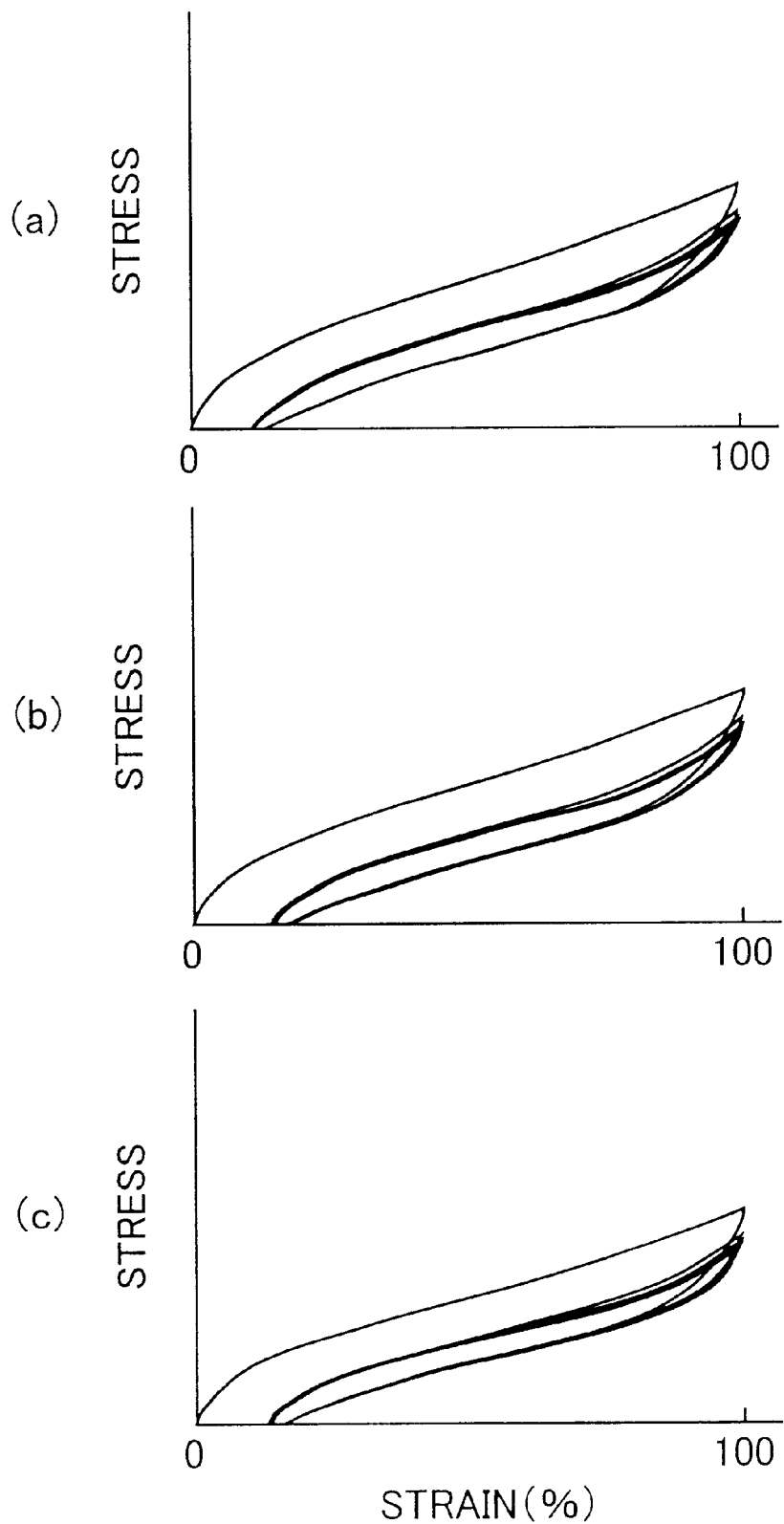
FIG. 6 is a view showing hysteresis curves of the rubber compositions of Comparative Example. (a), (b) and (c) are graphs showing hysteresis curves of Comparative Example 3-1, Comparative Example.3-2, and Comparative Example 3-3, respectively.

As evident from FIGS. 5 and 6, the rubber composition of the present invention (Examples 3-1 to 3-3) containing the recovered rubber 1 and the rubber composition of the present invention (Example 3-4) containing the recovered rubber 2 shows higher hysteresis compared to the rubber composition of basic formulation (Comparative Example 3-1). The hysteresis is significantly higher in the case of the rubber composition containing 20% by weight of the recovered rubber (Example 3-3) compared to the case wherein the composition contains 5% by weight of the recovered rubber (Example 3-1). Such feature is hardly found in Comparative Examples 3-2 and 3-3 containing the liquid polymer or the aromatic oil, and this demonstrates unique feature of the recovered rubber of the present invention.

Table 3 also demonstrates that the rubber composition having smaller content of the recovered rubber 1 exhibits smaller reduction in the stress-strain property compared to Comparative Example 3-1 of basic formulation, and that the rubber composition containing recovered rubber 2 (Example 3-4) exhibits the value of 300% modulus which is substantially equivalent with Comparative Example 3-1 of basic formulation.

Table 3 also shows ratio of the loss tangent to basic formulation (Comparative Example 3-1) wherein loss tangent at 60° C. of Comparative Example 3-1 was calculated as 100.

Table 3 also demonstrates that the loss tangent (tan δ) of the rubber compositions containing the recovered rubber 1 or 2 is higher than the Comparative Example 3-1 of basic

TABLE 3

(unit: parts by weight)

| | Example 3-1 | Example 3-2 | Example 3-3 | Example 3-4 | Comparative Example 3-1 | Comparative Example 3-2 | Comparative Example 3-3 |
|---|---|---|---|---|---|---|---|
| NR | 95 | 90 | 80 | 90 | 100 | 90 | 90 |
| Recovered rubber 1 | 5 | 10 | 20 | — | — | — | — |
| Recovered rubber 2 | — | — | — | 10 | — | — | — |
| Liquid polymer | — | — | — | — | — | 10 | — |
| Aromatic oil | — | — | — | — | — | — | 10 |
| Carbon black | 50 | 50 | 50 | 50 | 50 | 50 | 50 |
| Zinc oxide | 5 | 5 | 5 | 5 | 5 | 5 | 5 |
| Stearic acid | 3 | 3 | 3 | 3 | 3 | 3 | 3 |
| Antiaginq agent | 1 | 1 | 1 | 1 | 1 | 1 | 1 |
| Vulcanization accelerator | 1.2 | 1.2 | 1.2 | 1.2 | 1.2 | 1.2 | 1.2 |
| Sulfur | 1.8 | 1.8 | 1.8 | 1.8 | 1.8 | 1.8 | 1.8 |
| Hysteresis ratio | 186 | 250 | 439 | 303 | 100 | 115 | 98 |
| $M_{300}$ (Mpa) | 18.2 | 18.1 | 14.9 | 18.5 | 18.5 | 18.1 | 16.3 |
| $T_B$ (Mpa) | 25.8 | 23.9 | 18.8 | 23.5 | 28.0 | 26.6 | 26.5 |
| $E_B$ (%) | 423 | 410 | 393 | 389 | 442 | 440 | 477 |
| ENG (Mpa) | 50.7 | 48.5 | 39.5 | 44.7 | 55.5 | 52.1 | 58.5 |
| tan σ (0° C.) | 0.290 | 0.295 | 0.287 | 0.279 | 0.274 | 0.280 | 0.346 |
| tan σ (20° C.) | 0.247 | 0.280 | 0.291 | 0.272 | 0.209 | 0.214 | 0.274 |
| tan σ (60° C.) | 0.226 | 0.308 | 0.448 | 0.316 | 0.151 | 0.159 | 0.205 |
| Ratio | 150 | 204 | 297 | 209 | 100 | 105 | 136 |

Hysteresis curves are shown in FIGS. 5 and 6. It should be noted that FIGS. 5(a), 5(b), 5(c), and 5(d) show the results of Examples 3-1, Example 3-2, Example 3-3, and Example 3-4, respectively; and FIGS. 6(a), 6(b), and 6(c) show the results of Comparative Example 3-1, Comparative Example 3-2, and Comparative Example 3-3. It should also be noted that scale of the vertical axis is common for all graphs.

Hysteresis of each sample was also measured, and the ratio of the hysteresis to basic formulation (Comparative Example 3-1) was calculated by assuming the hysteresis of Comparative Example 3-1 as 100.

formulation, and this is particularly so for the loss tangent (tan δ) at 60° C. Also demonstrated is unique feature that the rubber compositions with larger content of the recovered rubber 1 (Examples 3-2 and 3-3) and the rubber composition containing the recovered rubber 2 (Example 3-4) exhibit loss tangent at 60° C. which is higher than the loss tangent at 0° C.

Example 4 and Comparative Example 4

<Production of Recovered Carbon Black>

Carbon black was obtained from the solid product produced by repeating the step of <Separation of vulcanized rubber> in Example 3, <Production of recovered rubber 1>. More illustratively, 70 g of the vulcanized rubber composition which was the same as the one used in Example 3 was immersed in 7 liters of toluene solution containing benzoyl peroxide (hereinafter abbreviated as BPO) at a concentration of 1% by weight, and the solution was agitated to obtain a non-viscous liquidified product (suspension). Centrifugation of this suspension resulted in the separation of the suspension into transparent solution phase and solid product.

The solid product was washed with toluene, air dried, and dried under vacuum to obtain carbon black 1.

<Production of Rubber Composition>

In Example 4 and Comparative Example 4, the rubber compositions produced by blending and kneading the components shown in Table 4 were heated to 148° C. for 10 minutes for vulcanization.

In Table 4, N339 is carbon black defined in ASTM code N339, and the antiaging agent and the vulcanization accelerator were the same as those used for the rubber compositions as described above.

TABLE 4

(unit: parts by weight)

|  | Example 4 | Comparative Example 4 |
| --- | --- | --- |
| NR | 100 | 100 |
| Carbon black 1 | 50 | — |
| N339 | — | 50 |
| Zinc oxide | 5 | 5 |
| Stearic acid | 3 | 3 |
| Antiaging agent | 1 | 1 |
| Vulcanization accelerator | 1.2 | 1.2 |
| Sulfur | 1.8 | 1.8 |

Figure 7:
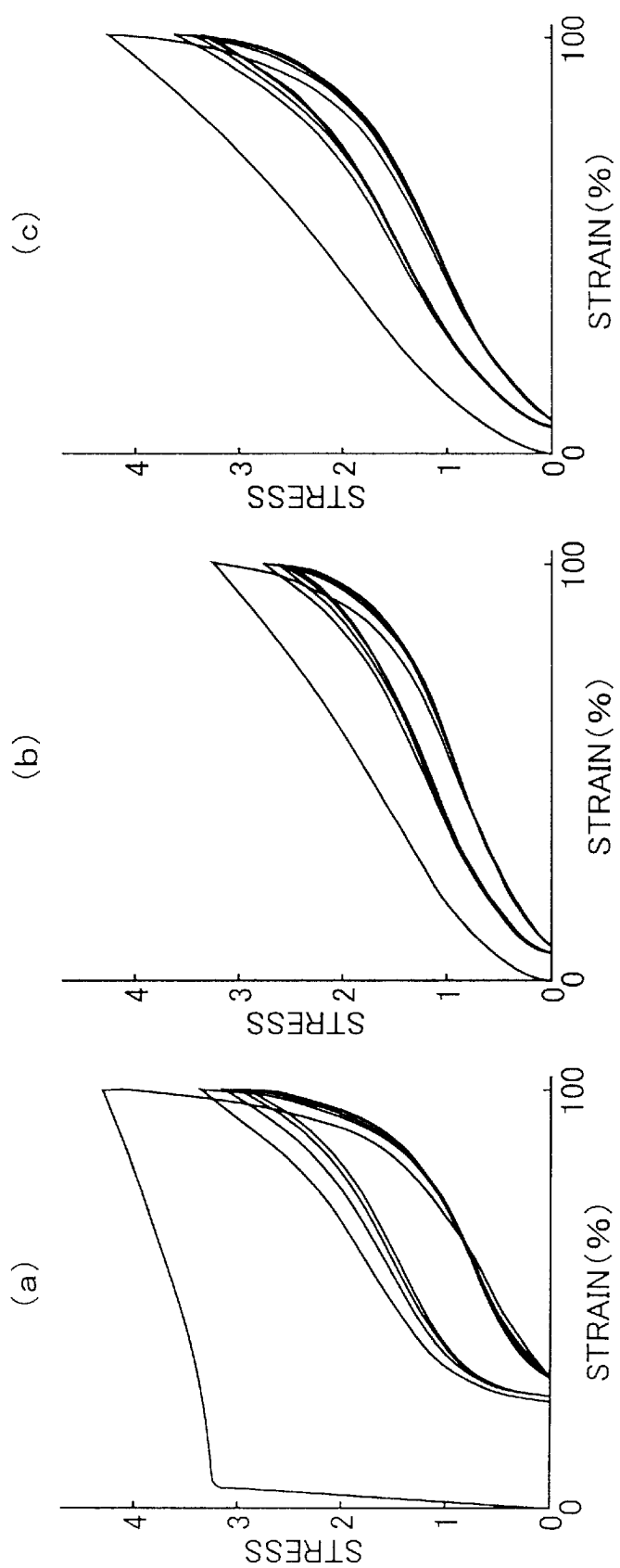
FIG. 7 is a view showing hysteresis curves of the rubber compositions. (a), (b) and (c) are graphs showing hysteresis curves of Example 4, Comparative Example 4, and Example 5-1, respectively.

Tensile strength of the vulcanized rubbers obtained in Example 4 and Comparative Example 4 (evaluated in accordance with the procedure described in JIS K6254 by stretching the sample 5 times until the elongation is 100%) is shown FIG. 7. FIG. 7(a) shows the results of Example 4, and FIG. 7(b) shows the results of Comparative Example 4. In these graphs, the vertical axis is scaled in 9.8 N increments.

Figure 8:
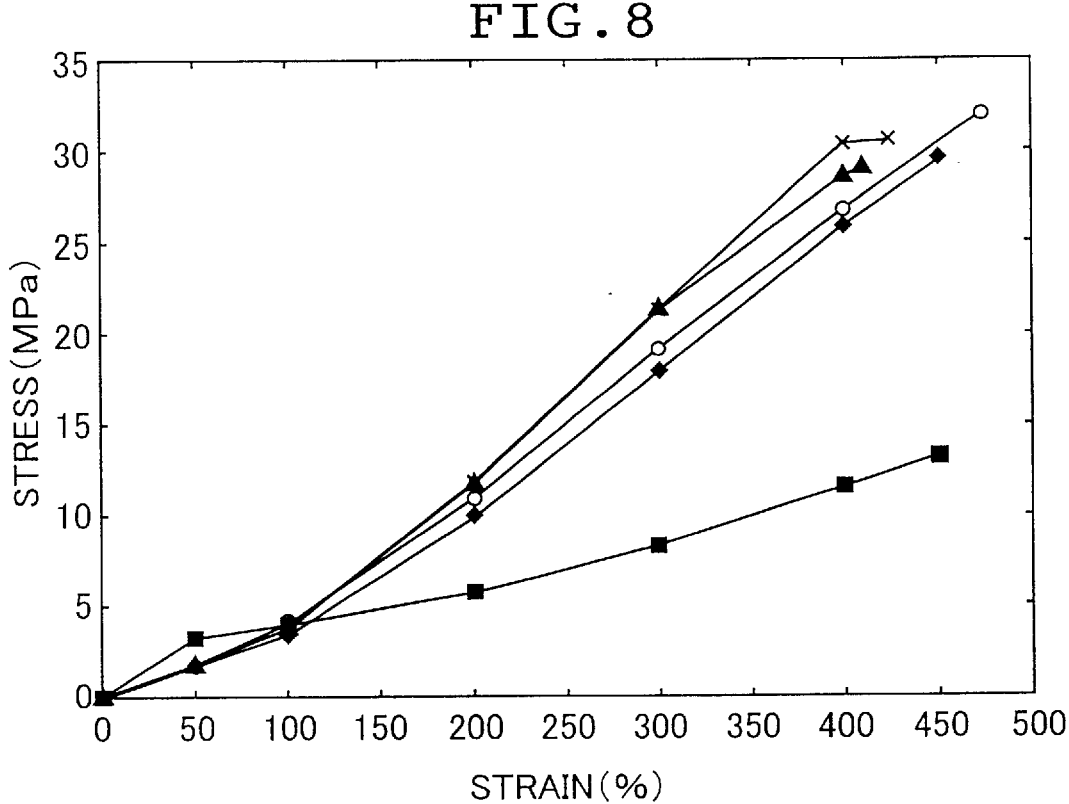
FIG. 8 is a graph shooing stress in relation to strain.

The stress-strain property of the vulcanized rubbers obtained in Example 4 and Comparative Example 4 (evaluated for a dumbbell-shaped test piece having a thickness of 1 mm (JIS No. 3) in accordance with the procedure described in JIS K6251) is shown in FIG. 8. In the graph, Example 4 is indicated by square, and Comparative Example 1 is indicated by rhombus.

Figure 9:
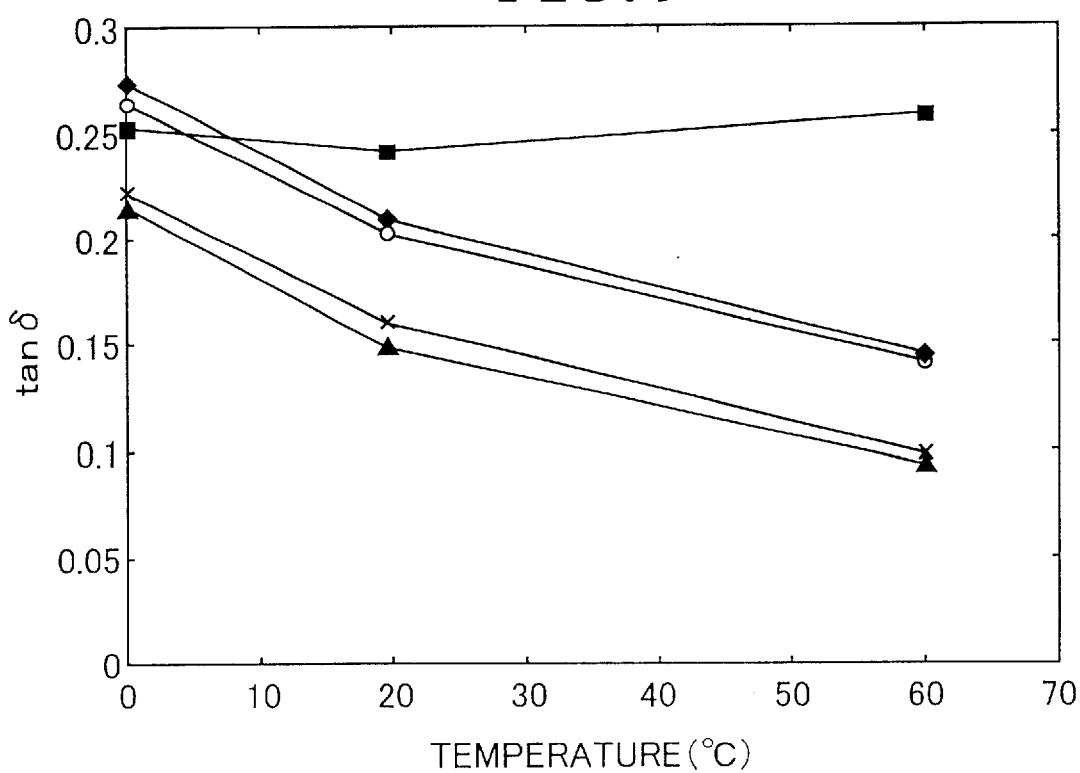
FIG. 9 is a graph showing loss tangent (tan δ) in relation to temperature.

The loss tangent (tan δ) of the vulcanized rubbers obtained in Example 4 and Comparative Example 4 is shown in FIG. 9. In the graph, Example 4 is indicated by square (■), and Comparative Example 4 is indicated by rhombus (♦).

As demonstrated in FIG. 7, the rubber composition containing carbon black 1 (Example 4) exhibits unique hysteresis curve, namely, a hysteresis curve with very large hysteresis curve compared to the rubber composition of Comparative Example 4 containing the conventional carbon black N339.

As demonstrated in FIG. 8, the rubber composition containing carbon black 1 (Example 4) exhibits unique stress-strain curve compared to the rubber composition of Comparative Example 4.

As demonstrated in FIG. 9, the rubber composition containing carbon black 1 (Example 4) exhibits unique loss tangent compared to the rubber composition of Comparative Example 4, and such rubber composition is quite preferable for use in seismic energy-absorbing member in various seismic isolation structure.

Examples 5-1 to 2 and Comparative Example 5

<Heat Treatment of Recovered Carbon Black>

Carbon black 1 obtained in Example 4, <Production of carbon black> was heat treated in nitrogen atmosphere at 800° C. for 60 minutes, and the treated carbon black was designated heat treated recovered carbon black 2.

Vulcanized rubber of the formulation shown in Table 1 was cut into small pieces having an average dimension of about 1.5 mm×1.5 mm×1.5 mm, and the pieces were directly heat treated in nitrogen atmosphere at 800° C. for 60 minutes. The recovered carbon black was designated carbon black 3.

Virgin carbon black N339 with no treatment was heat treated under the conditions identical with the carbon black 2. The obtained carbon black was designated carbon black 4.

<Production of Rubber Composition>

The rubber compositions produced by blending and kneading the components shown in Table 5 were heated to 148° C. for 10 minutes for vulcanization. The antiaging agent and the vulcanization accelerator were the same as those used for the rubber compositions as described above.

TABLE 5

(unit: parts by weight)

|  | Example 5-1 | Example 5-2 | Comparative Example 5 |
| --- | --- | --- | --- |
| NR | 100 | 100 | 100 |
| Carbon black 2 | 50 | — | — |
| Carbon black 3 | — | 50 | — |
| Carbon black 4 | — | — | 50 |
| Zinc oxide | 5 | 5 | 5 |
| Stearic acid | 3 | 3 | 3 |
| Antiaging agent | 1 | 1 | 1 |
| Vulcanization Accelerator | 1.2 | 1.2 | 1.2 |
| Sulfur | 1.8 | 1.8 | 1.8 |

<Evaluation>

Tensile strength of the rubber composition obtained in Example 5-1 is shown as (c) in FIG. 7 as described above.

The stress-strain property of the rubber composition obtained in Example 5-1, Example 5-2, and Comparative Example 5 is shown in FIG. 8, as described above.

Loss tangent (tan δ) of the rubber composition obtained in Example 5-1, Example 5-2, and Comparative Example 5 is shown in FIG. 9.

In FIG. 8 and FIG. 9, Example 5-1 is indicated by solid triangle (▲), Example 5-2 is indicated by (×), and Comparative Example 5 is indicated by (○).

As demonstrated in FIGS. 7 and 8, the rubber composition containing the heat treated carbon black 2 (Example 5-1) (▲) and the rubber composition containing carbon black 3 (Example 5-2) (×) exhibits equivalent or superior stress-strain properties compared to the rubber composition of Comparative Example 4 (♦) containing the conventional virgin carbon black N339, or that of Comparative Example 5 (○) containing carbon black 4 and at the same time, they exhibit lower loss tangent (tan δ) as demonstrated in FIG. 9.

Especially, loss tangent (tan δ) reducing rate at 60° C. indicative of a rolling resistance is high, this means the compositions exhibit good rolling resistance.

Example 6 to 12

4 liters of toluene was used for 50 g of starting virgin carbon black (ASTM code N339), and the carbon black was mixed with the components shown in Table 6 in toluene at 25° C. After the toluene removal or drying by distillation under reduced pressure or decantation, the mixture was heated in quartz glass tube furnace in nitrogen atmosphere at 800° C. for 60 minutes to obtain treated carbon black (product).

<Production of Vulcanized Rubber>

The thus obtained treated carbon black was used to obtain the vulcanized rubber of the formulation as shown in Table 1.

Comparative Example 6

A vulcanized rubber of formulation shown in Table 1 was produced by using non-treated carbon black (ASTM code, N339).

Comparative Example 7

Carbon black N339 alone in the absence of other ingredients was heat treated as in the case of the Example.

A vulcanized rubber was obtained by repeating the procedure of Comparative Example 6 except that this carbon black was used instead of the carbon black N339.

Reference Example 2

The procedure of Example 6 was repeated except that the ingredients shown in Table 6 were used in the heat treatment to obtain heat treated carbon black.

The procedure of Comparative Example 6 was repeated except that the thus produced carbon black was used instead of the carbon black N339 to produce the vulcanized rubber.

<Tests>

The thus obtained vulcanized rubbers were evaluated for their stress-strain (S-S) curve, and also, for 300% modulus ($M_{300}$), strength at break ($T_B$), elongation at break ($E_B$), and energy (ENG) corresponding to the area calculated from S-S curve. tan δ at 60° C. was also measured. The results are shown in Table 6.

The values calculated by assuming the tan δ of Comparative Example 6 at 60° C. as 100 are also indicated in Table 6.

TABLE 6

| | Comparative Example 6 | Comparative Example 7 | Reference Example 2 | Example 6 | Example 7 | Example 8 | Example 9 | Example 10 | Example 11 | Example 12 |
|---|---|---|---|---|---|---|---|---|---|---|
| Carbon black | N339 50 | 50 | 50 | 50 | 50 | 50 | 50 | 50 | 50 | 50 |
| NR | | | | | | 100 | 100 | 100 | 100 | 100 |
| Vulcanization aid | | | | | | | | | | |
| ZnO | | | | 5 | 5 | | 5 | 5 | | 5 |
| St · A | | | | 3 | 3 | | 3 | 3 | | 3 |
| Antiaging agent | | | | | | | | | | 1 |
| Vulcanizer | | | | | | | | | | |
| AC | | | 1.2 | | 1.2 | | | 1.2 | 1.2 | 1.2 |
| S | | | 1.8 | | 1.8 | | | 1.8 | 1.8 | 1.8 |
| BPO | | | | | | | | | | BPO* |
| Heat treatment | | | | | Heat treatment ($N_2$, 800° C. × 60 min.) | | | | | |
| 60° C. tan σ | 0.146 | 0.141 | 0.140 | 0.135 | 0.136 | 0.114 | 0.099 | 0.110 | 0.116 | 0.087 |
| Ratio | 100 | 97 | 96 | 92 | 93 | 78 | 68 | 75 | 79 | 60 |
| 300% M (MPa) | 19.1 | 19.5 | 19.1 | 17.2 | 17.3 | 21.5 | 20.6 | 19.6 | 22.7 | 21.3 |
| TB (MPa) | 30.4 | 31.9 | 31.2 | 30.9 | 30.6 | 31.6 | 30.6 | 31.4 | 31.4 | 30.2 |
| EB (%) | 455 | 473 | 494 | 485 | 482 | 450 | 450 | 461 | 430 | 415 |
| ENG (MPa) | 60.1 | 69.4 | 72.3 | 63.5 | 64.0 | 66.4 | 63.3 | 64.3 | 62.2 | 56.0 |

BPO*: 1% solution in toluene
In Table 6, NR and the antiaging agent are the same as Table 1.
Ac: vulcanization aid: N-t-butyl-2-benzothiazyl-sulfeneamide
BPO: benzoyl peroxide
S: sulfur

INDUSTRIAL APPLICABILITY

The separation method of the present invention is capable of readily liquidifying the vulcanized rubber composition without using high temperature. Accordingly, use of such separation method enables liquidification of the vulcanized rubber composition in a simple, convenient apparatus without using thermal decomposition apparatus, and rubber components, filler components such as carbon black and silica, and rubber subsidiary materials such as steel member can be readily separated from vulcanized rubber products.

The separation method of the present invention is capable of liquidifying an unvulcanized rubber composition irrespective of whether the unvulcanized rubber composition is partly vulcanized, the size of such vulcanized parts, or the degree of the crosslinking and with no need of separating such vulcanized parts or heating. Accordingly, when rubber scraps or defective rubber products inevitably produced in the production of vulcanized rubber products are treated for the purpose of recovering rubber materials therefrom, troublesome steps of removing steel member or organic fibers, removing vulcanized parts, or separating rubber scraps are no longer required, and the rubber components, filler components such as carbon black and silica, and rubber subsidiary materials such as steel can be readily separated from unvulcanized rubber composite materials and unvulcanized rubber compositions in a simple, convenient installation.

The present invention is also capable of readily recovering the rubber from waste of any rubber composition irrespective of whether the rubber is vulcanized or unvulcanized, or the degree of the vulcanization, and the thus recovered rubber is well adapted for reuse, and the recovered rubber also has its unique feature.

The rubber composition of the present invention produced by using the recovered rubber of the present invention as a starting material exhibits high hysteresis and excellent damping performance, and therefore, such rubber composition is quite preferable for use in a seismic energy absorbing member in various seismic isolation, vibration control, and seismic resistant structures. The rubber composition also exhibits high loss tangent (tan δ), and in particular, high tan δ at 60° C. Accordingly, the rubber composition is also useful in a wide variety of applications including tire tread where high grip properties are required.

The recovered carbon black of the present invention can be obtained from waste of any rubber composition irrespective of whether the rubber is vulcanized or unvulcanized, or the degree of the vulcanization, and the recovered rubber also has its unique feature. The rubber composition of the present invention produced by using the recovered rubber of the present invention as a starting material exhibits high hysteresis and excellent damping performance, and therefore, such rubber composition is quite preferable for use in a seismic energy absorbing member in various seismic isolation, vibration control, and seismic resistant structures.

The present invention also provides a method for producing a carbon black which is capable of maintaining rubber properties of the vulcanized rubber and reinforcement effects of a carbon black, and simultaneously, capable of reducing loss tangent (tan δ) at 60° C. indicative of the rolling resistance by large reduction rate, the carbon black produced by such method, and the rubber composition and the vulcanized rubber containing such carbon black. Recovered carbon black which has been heat treated in non-oxidizing atmosphere may also be used for the starting carbon black. The heat treated carbon black of the present invention realizes excellent tensile stress property as well as extremely low loss tangent (tan δ), and therefore, it realizes a rubber composition having sufficiently low rolling resistance, which is a property critical for the rubber composition used in producing a tire with improved fuel efficiency. Such carbon black, rubber composition, and vulcanized rubber of the present invention are useful in a wide variety of applications, and in particular, for use in tire tread and tire undertread.

What is claimed is:

1. A method for separating a vulcanized rubber composition containing a vulcanized rubber and at least carbon black wherein the vulcanized rubber composition is immersed in an organic solvent containing 0.01 to 50% of a peroxide with or without agitation to liquidify the vulcanized rubber composition for separation of a rubber component as a liquid phase and a carbon black component as a solid phase in the vulcanized rubber composition, wherein said immersion is conducted such that the ratio of the vulcanized rubber composition (mg)/the organic solvent (ml) is lower than 50.

2. A method for separating a vulcanized rubber composition according to claim 1 wherein the ratio of the vulcanized rubber composition (mg)/the organic solvent (ml) is up to 30.

3. A method for separating a vulcanized rubber composition according to claim 1 wherein said method further comprises the steps of removing the separated carbon black component from the reaction system and adding further organic solvent to the reaction system.

4. A method for separating the vulcanized rubber composition according to claim 1 wherein said immersion with or without agitation is conducted at a temperature of 0 to 40° C.

5. A method for separating the vulcanized rubber composition according to claim 1 wherein said vulcanized rubber composition is in the form of a block having at least one edge exceeding 2 mm.

6. A method for separating the vulcanized rubber composition according to claim 1 wherein said separation is conducted by centrifugation, membrane separation, or decantation.

7. A method for separating the vulcanized rubber composition according to claim 1 wherein said peroxide is selected from the group consisting of benzoyl peroxide, t-butyl hydroperoxide, diisopropylbenzene hydroperoxide, p-methane hydroperoxide, cumene hydroperoxide, and azobisisobutyronitrile.

8. A method for separating the vulcanized rubber composition according to claim 1 wherein said vulcanized rubber composition is a vulcanized rubber composition containing at least 1 part by weight of carbon black and/or silica per 100 parts by weight of the rubber component.

9. A method for separating an unvulcanized rubber composition comprising an unvulcanized rubber and at least a filler wherein the unvulcanized rubber composition is immersed in an organic solvent containing 0.01 to 50% by weight of a peroxide with or without agitation to liquidity the unvulcanized rubber composition for separation of the rubber component and the filler component in the unvulcanized rubber composition.

10. A method for separating the unvulcanized rubber composition according to claim 9 wherein said unvulcanized rubber composition is immersed in said organic solvent at a ratio of the unvulcanized rubber composition (mg)/the organic solvent (ml) of up to 30.

11. A method for separating an unvulcanized rubber composition containing an unvulcanized rubber and, at least, a filler wherein the unvulcanized rubber composition is immersed in an organic solvent containing 0.01 to 50% by weight of a peroxide with or without agitation to liquidity the unvulcanized rubber composition for separation of the rubber component and the filler component in the unvulcanized rubber composition, wherein said immersion is conducted such that the ratio of the unvulcanized rubber composition (mg)/the organic solvent (ml) is up to 30, and wherein said method further comprises the steps of removing the separated filler component from the reaction system and adding further unvulcanized rubber composition and/or organic solvent to the reaction system.

12. A method for separating the unvulcanized rubber composition according to claim 9 wherein said immersion with or without agitation is conducted at a temperature of 0 to 40° C.

13. A method for separating the unvulcanized rubber composition according to claim 9 wherein said unvulcanized rubber composition is in the form of a block having at least one edge exceeding 2 mm.

14. A method for separating the unvulcanized rubber composition according to claim 9 wherein said separation is conducted by centrifugation, membrane separation, or decantation.

15. A method for separating the unvulcanized rubber composition according to claim 9 as wherein said peroxide is selected from the group consisting of benzoyl peroxide, t-butyl hydroperoxide, diisopropylbenzene hydroperoxide, p-methane hydroperoxide, cumene hydroperoxide, and azobisisobutyronitrile.

16. A method for separating the unvulcanized rubber composition according to claim 9 wherein said unvulcanized rubber;composition is an unvulcanized rubber composition containing at least 1 part by weight of carbon black and/or silica per 100 parts by weight of the rubber component.

17. A method for producing a carbon black comprising the step of heat-treating a virgin carbon black in a non-oxidizing atmosphere at a temperature of 300° C. to 1500° C. for at least 30 seconds in the presence of at least one rubber compound component selected from rubber and a vulcanization aid.

18. A method for producing the carbon black according to claim 17 wherein a vulcanizer is further comprised as a rubber compound component.

19. A method for producing the carbon black according to claim 17 wherein said virgin carbon black and said rubber compound component are mixed in an organic solvent having a tan δ lower than the rubber composition produced by substituting the carbon black with a virgin carbon black of equivalent blend ratio.

20. A method for producing the carbon black according to claim 17 or 18 wherein said rubber is a diene rubber.

21. A method for producing the carbon black according to claim 17 or 18 wherein said vulcanization aid is zinc oxide and/or stearic acid.

22. A method for producing the carbon black according to claim 17 or 18 wherein said vulcanizer is at least one member selected from sulfur, an organic peroxide, and a vulcanization accelerator.

23. A method for producing the carbon black according to claim 17 or 18 wherein said method further comprises the step of producing a starting virgin carbon black.

24. A carbon black produced by the method for producing the carbon black of claim 17 or 18 wherein said carbon black is capable of producing a rubber composition having a tan δ lower than the rubber composition produced by substituting the carbon black with a virgin carbon black of equivalent blend ratio.

25. A rubber composition containing the carbon black of claim 24.

26. A vulcanized rubber obtained from the rubber composition of claim 17.

27. A heat treating method of the recovered carbon black obtained by the method of claim 1, comprising heat-treating said carbon black in a non-oxidizing atmosphere at a temperature of 300° C. to 1500° C. for at least 30 seconds and obtaining a carbon black having the amount of organic components on the surface of said carbon black equivalent to or less than the amount of organic components on the surface of a virgin carbon black used for the starting material of the rubber composition.

28. A rubber composition containing the recovered carbon black obtained from the method of claim 27, and a rubber and/or a resin.

29. A method for separating the vulcanized rubber composition according to claim 1 wherein said vulcanized rubber composition is a rubber composite material containing said vulcanized rubber composition and at least one structural member other than the vulcanized rubber composition.

30. A method for separating the vulcanized rubber composition according to claim 29 wherein said immersion with or without agitation is conducted at a temperature of 0 to 40° C.

31. A method for separating the vulcanized rubber composition according to claim 29 wherein said rubber composite material is in the form of a block having at least one edge exceeding 2 mm.

32. A method for separating the vulcanized rubber composition according to claim 29 wherein said separation is conducted by centrifugation, membrane separation, or decantation.

33. A method for separating the vulcanized rubber composition according to claim 29 wherein said peroxide is selected from the group consisting of benzoyl peroxide, t-butyl hydroperoxide, diisopropylbenzene hydroperoxide, p-methane hydroperoxide, cumene hydroperoxide.

34. A method for separating the vulcanized rubber composition according to claim 29 wherein said vulcanized rubber composition is a vulcanized rubber composition containing at least 1 part by weight of carbon black and/or silica per 100 parts by weight of the rubber component.

* * * * *